United States Patent
Ishiyama

(10) Patent No.: US 7,809,159 B2
(45) Date of Patent: Oct. 5, 2010

(54) ESTIMATION SYSTEM, ESTIMATION METHOD, AND ESTIMATION PROGRAM FOR ESTIMATING OBJECT STATE

(75) Inventor: Rui Ishiyama, Tokyo (JP)

(73) Assignee: NEC Corporation, Tokyo (JP)

(*) Notice: Subject to any disclaimer, the term of this patent is extended or adjusted under 35 U.S.C. 154(b) by 1193 days.

(21) Appl. No.: 10/573,913

(22) PCT Filed: Oct. 28, 2004

(86) PCT No.: PCT/JP2004/016030

§ 371 (c)(1),
(2), (4) Date: Mar. 30, 2006

(87) PCT Pub. No.: WO2005/043466

PCT Pub. Date: May 12, 2005

(65) Prior Publication Data

US 2007/0009135 A1    Jan. 11, 2007

(30) Foreign Application Priority Data

Oct. 30, 2003    (JP)    ............... 2003-370137

(51) Int. Cl.
*G06K 9/00*    (2006.01)
(52) U.S. Cl. .................... 382/103; 382/154
(58) Field of Classification Search ............ 382/103, 382/154
See application file for complete search history.

(56) References Cited

U.S. PATENT DOCUMENTS 5,469,274 A * 11/1995 Iwasaki et al. ............. 358/450
5,819,016 A * 10/1998 Watanabe et al. .......... 345/419

(Continued)

FOREIGN PATENT DOCUMENTS

JP    09-035063    2/1997

(Continued)

OTHER PUBLICATIONS

Nomura, Y.; Dill Zhang; Sakaida, Y.; Fujii, S.; 3-D object pose estimation based on iterative image matching: Shading and edge data fusion, Proceedings of the 13th International Conference on Pattern Recognition, 1996. vol. 1, Aug. 25-29, 1996 pp. 513-517.*

(Continued)

*Primary Examiner*—Wenpeng Chen
*Assistant Examiner*—Gandhi Thirugnanam
(74) *Attorney, Agent, or Firm*—Dickstein Shapiro LLP

(57) ABSTRACT

3D model storage stores the 3D shape data of a target object and illumination base data in advance. A comparison image generator generates, as a comparison image, a reproduced image with the target object being arranged in the position/posture of the current estimation value under the same illumination condition as that for the input image on the basis of the 3D shape data and illumination base data. An image displacement distribution detector segments the comparison image into sub regions and detects the image displacement distribution between the comparison image and the input image for each sub region. A posture difference calculator calculates a position/posture difference value on the basis of the image displacement distribution and 3D shape data. An end determinator outputs the current position/posture estimation value as an optimum position/posture estimation value when determining that the position/posture difference value is smaller than a predetermined threshold value.

33 Claims, 13 Drawing Sheets

U.S. PATENT DOCUMENTS

| | | | |
|---|---|---|---|
| 6,081,273 A * | 6/2000 | Weng et al. | 345/420 |
| 6,173,066 B1 * | 1/2001 | Peurach et al. | 382/103 |
| 6,181,806 B1 * | 1/2001 | Kado et al. | 382/118 |
| 6,580,810 B1 * | 6/2003 | Yang et al. | 382/103 |
| 6,956,569 B1 * | 10/2005 | Roy et al. | 345/426 |
| 2002/0052709 A1 * | 5/2002 | Akatsuka et al. | 702/153 |
| 2002/0085771 A1 * | 7/2002 | Sakuramoto | 382/282 |
| 2002/0172413 A1 * | 11/2002 | Chen | 382/154 |
| 2003/0035098 A1 * | 2/2003 | Ishiyama | 356/72 |
| 2003/0161504 A1 * | 8/2003 | Inoue | 382/115 |
| 2006/0188131 A1 * | 8/2006 | Zhang et al. | 382/103 |
| 2007/0009135 A1 * | 1/2007 | Ishiyama | 382/103 |

FOREIGN PATENT DOCUMENTS

| | | |
|---|---|---|
| JP | 11-110570 | 4/1999 |
| JP | 2000-348186 | 12/2000 |
| JP | 2002-063567 | 2/2002 |
| JP | 20002-157595 | 5/2002 |
| JP | 2003-058896 | 2/2003 |
| JP | 2003-323622 | 11/2003 |

OTHER PUBLICATIONS

Kayanuma, M.; Hagiwara, M.;A new method to detect object and estimate the position and the orientation from an image using a 3-D model having feature points, 1999 IEEE International Conference on Systems, Man, and Cybernetics, 1999. vol. 4, Oct. 12-15, 1999 pp. 931-936.*

Barron et al., International Journal of Computer Vision, vol. 12:1, pp. 43-77 (1994).

Drummon et al., "Real Time Feature-Based Facial Tracking Using Lie Algebras", IEICE Transactions on Information and Systems, vol. E-84-D, No. 12, pp. 1733-1738 (2001).

* cited by examiner

ESTIMATION SYSTEM, ESTIMATION METHOD, AND ESTIMATION PROGRAM FOR ESTIMATING OBJECT STATE

TECHNICAL FIELD

The present invention relates to an estimation system, estimation method, and estimation program for estimating the position or posture of an object and, more particularly, to an estimation system, estimation method, and estimation program for estimating an object state, which can quickly and accurately estimate one or both of the position and posture of an object contained in an image sensed by a camera or read out from a storage medium even when an illumination condition varies.

BACKGROUND ART

An example of an apparatus capable of estimating the position or posture of an object is a position/posture recognition apparatus for recognizing the position or posture of an object. FIG. 14 is a block diagram showing the arrangement of a conventional position/posture recognition apparatus. This position/posture recognition apparatus includes a posture candidate group determination means 910, comparison image generation means 920, posture selection means 930, and end determination means 940.

The operation of the position/posture recognition apparatus shown in FIG. 14 will be described. Input image data 91 containing the image of an object (to be referred to as a target object hereinafter) as a position/posture estimation target is input to the position/posture recognition apparatus. Rough object position/posture parameters containing known errors are also input to the position/posture recognition apparatus as a position/posture initial value 92. The posture candidate group determination means 910 determines a plurality of position/posture estimation value groups by changing six position/posture parameters (3D parameters in X-, Y- and Z-axis directions and angle parameters about X-, Y-, and Z-axes) contained in the position/posture initial value 92 by a predetermined variation.

On the basis of the 3D shape model data of the target object and a base texture group to generate an illumination variation space, which are stored in the storage unit (not shown) of the position/posture recognition apparatus in advance, the comparison image generation means 920 generates illumination variation space data which represents an image variation caused by a change in illumination condition when the target object has a position/posture corresponding to each position/posture estimation value group. The comparison image generation means 920 generates a comparison image group under the same illumination condition as that for the input image data 91 on the basis of the illumination variation space data.

The posture selection means 930 compares the comparison image group with the input image data 91 and outputs, as an optimum position/posture estimation value 93, a position/posture estimation value corresponding to a comparison image with highest similarity. If there still is room for improvement of the similarity of the comparison image, the end determination means 940 replaces the optimum position/posture estimation value 93 with the position/posture initial value 92 (or current position/posture estimation value) and outputs the value to the posture candidate group determination means 910. The position/posture recognition apparatus repeatedly executes the above-described processing until the similarity of the comparison image cannot be improved anymore, thereby finally obtaining the optimum position/posture of the target object (e.g., Japanese Patent Laid-Open No. 2003-58896 (reference 1)).

DISCLOSURE OF INVENTION

Problem to be Solved by the Invention

When the conventional position/posture recognition apparatus is used, the optimum position or posture of a target object can finally be obtained. However, in generating a new position/posture estimation value group based on the optimum position/posture estimation value 93 at each processing time, the posture candidate group determination means 910 does not know the position/posture parameter change amounts to obtain an almost accurate position/posture. Instead, the posture candidate group determination means 910 generates a number of position/posture estimation values by simply increasing/decreasing the parameters by a predetermined variation. The position/posture recognition apparatus must execute comparison image generation processing with large complexity for all the position/posture estimation values. Hence, the processing time until obtaining the final optimum position/posture estimation value is long.

The present invention has been made to solve this problem, and has as its object to estimate the position or posture of an object contained in an image in a shorter time than before.

Means of Solution to the Problem

According to the present invention, there is provided an estimation system for estimating an object state, characterized by comprising image input means for inputting an input image containing an object whose state is to be estimated, the state being at least one of a position and posture, 3D shape data storage means for storing 3D shape data of the object, comparison image generation means for generating, as a comparison image, an image containing the object in a predetermined state by using the 3D shape data stored in the 3D shape data storage means, image positional relationship detection means for detecting, for each sub-region having a predetermined size in the image, a positional relationship between the input image and the comparison image generated by the comparison image generation means, correction amount calculation means for calculating a correction amount of the object state in the comparison image by using the positional relationship detected by the image positional relationship detection means, and state correction means for correcting the object state set in comparison image generation by the comparison image generation means by using the correction amount obtained by the correction amount calculation means, thereby calculating a new object state.

According to the present invention, there is provided an estimation method of estimating an object state, characterized by comprising the steps of inputting an input image containing an object whose state is to be estimated, the state being at least one of a position and posture, generating, as a comparison image, an image containing the object in a predetermined state by using 3D shape data of the object, detecting a positional relationship between the comparison image and the input image for each sub-region having a predetermined size in the image, calculating a correction amount of the object state in the comparison image by using the detected positional relationship, and correcting the object state set in comparison image generation by using the calculated correction amount, thereby calculating a new object state.

According to the present invention, there is provided an estimation program for estimating an object position, characterized by causing a computer to execute the steps of inputting an input image containing an object whose state is to be estimated, the state being at least one of a position and posture, generating, as a comparison image, an image containing the object in a predetermined state by using 3D shape data of the object, detecting a positional relationship between the comparison image and the input image for each sub-region having a predetermined size in the image, calculating a correction amount of the object state in the comparison image by using the detected positional relationship, and correcting the object state set in comparison image generation by using the calculated correction amount, thereby calculating a new object state.

EFFECT OF THE INVENTION

According to the present invention, a position or posture difference value is calculated on the basis of an image displacement distribution and 3D shape data. A position/posture estimation value is calculated such that the initial predicted value containing an error converges the actual position/posture in a minimum distance. For this reason, the number of times of comparison image generation can be reduced, and the complexity in calculating the position/posture estimation value of the target object can be reduced. Hence, the position or posture of an object contained in an image can be estimated in a shorter time than before.

BEST MODE FOR CARRYING OUT THE INVENTION

First Embodiment

Figure 1:
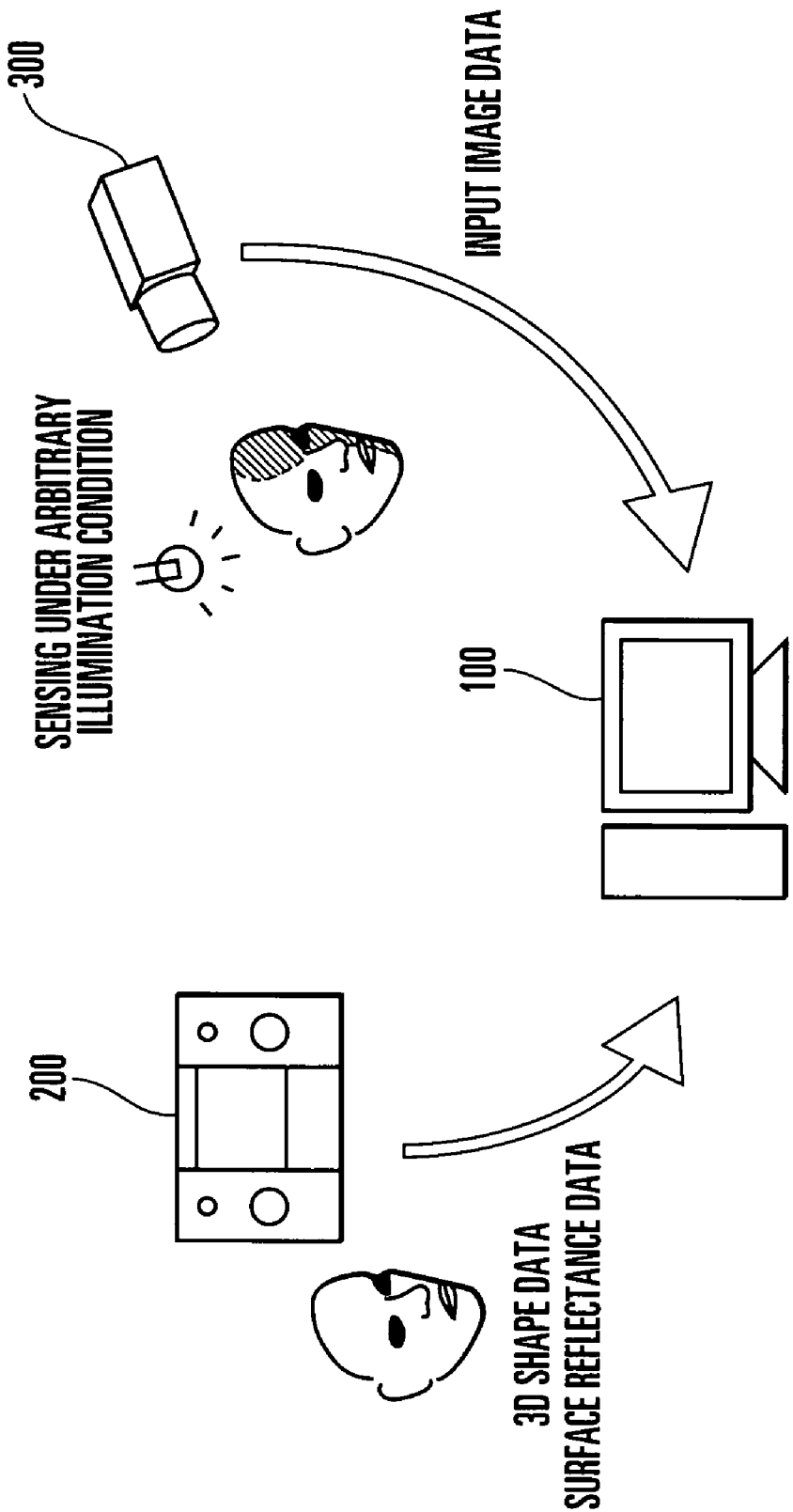
FIG. 1 is an explanatory view showing an example of environment in which an estimation system according to the present invention to estimate an object state is applied as an object position/posture estimation system.

The first embodiment of the present invention will be described below with reference to the accompanying drawings. FIG. 1 is an explanatory view showing an example of environment in which an estimation system according to the present invention to estimate an object state is applied as an object position/posture estimation system. As shown in FIG. 1, the object position/posture estimation system includes a computer 100 (central processing unit, processor, or data processing unit) which executes each processing in accordance with a program, a 3D shape measuring apparatus 200 which measures the 3D shape and surface reflectance of a target object, and a camera 300 which senses an object including the target object.

Figure 2:
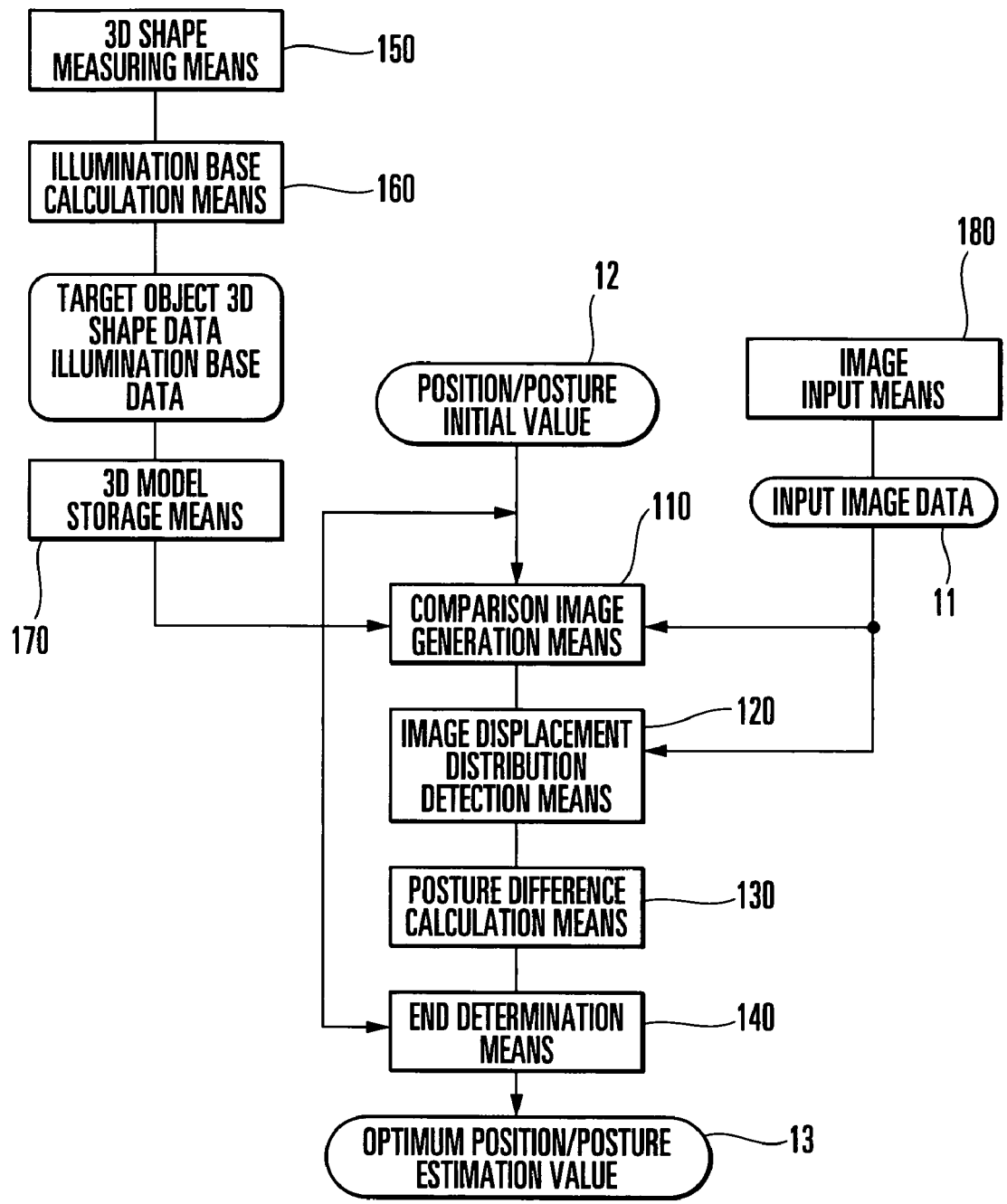
FIG. 2 is a block diagram showing an arrangement example of the object position/posture estimation system.

FIG. 2 is a block diagram showing an arrangement example of the object position/posture estimation system. As shown in FIG. 2, the object position/posture estimation system includes a comparison image generation means 110, image displacement distribution detection means 120, posture difference calculation means 130, end determination means 140, 3D shape measuring means 150, illumination base calculation means 160, 3D model storage means 170, and image input means 180. The computer 100 shown in FIG. 1 includes the comparison image generation means 110, image displacement distribution detection means 120, posture difference calculation means 130, end determination means 140, illumination base calculation means 160, and 3D model storage means 170 of the components shown in FIG. 2.

The 3D shape measuring means 150 is implemented by the 3D shape measuring apparatus 200. The 3D shape measuring means 150 measures the 3D shape and surface reflectance of a target object whose position/posture (at least one of the position and posture) is to be estimated and generates the 3D shape data and surface reflectance data of the target object. The illumination base calculation means 160 is implemented by, e.g., the control unit (not shown) of the computer 100. On the basis of the 3D shape data and surface reflectance data of the target object, the illumination base calculation means 160 calculates illumination base data representing a change in luminance depending on the illumination condition of each part of the target object.

Figure 3:
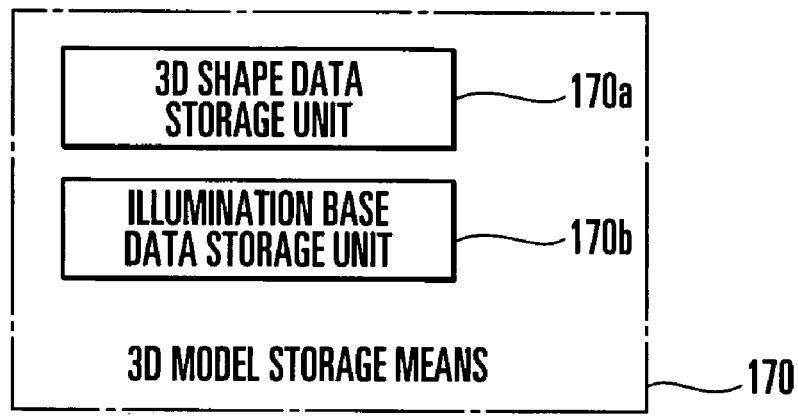
FIG. 3 is a block diagram showing an arrangement example of a 3D model storage means.

The 3D model storage means 170 is implemented by a storage device (not shown) provided in the computer 100. The 3D model storage means 170 stores the target object 3D shape data generated by the 3D shape measuring means 150 and the illumination base data calculated by the illumination base calculation means 160. Hence, the 3D model storage means 170 includes a 3D shape data storage unit 170a and illumination base data storage unit (illumination base image group storage unit) 170b, as shown in FIG. 3.

The image input means 180 is implemented by the camera 300. The image input means 180 senses an object including a target object whose position/posture is to be estimated and generates input image data 11. The image input means 180 inputs the generated input image data 11 to the computer 100. The image input means 180 also receives input of a position/posture initial value 12, i.e., a predicted value of the position/posture of the target object in the input image. As the position/posture initial value 12, the image input means 180 receives, e.g., an approximate value of the position/posture of the target object, which is input while observing the input image. The image input means 180 outputs the input position/posture initial value 12 to the computer 100.

In this embodiment, the object position/posture estimation system estimates an accurate position/posture of a target object by correcting the error of the position/posture initial value 12. That is, the position/posture initial value 12 is used as the initial value of the position/posture estimation value of a target object. The object position/posture estimation system obtains the difference (error) between the current position/posture estimation value (position/posture initial value 12 at the start of processing) and the actual position/posture of the target object at each step of estimation processing and sequentially repeats correction of the position/posture estimation value, thereby finally obtaining an optimum position/posture estimation value.

The comparison image generation means 110 is implemented by, e.g., the control unit of the computer 100. The comparison image generation means 110 generates, as a comparison image, a target object image under an illumination condition equal or analogous to that for the input image on the basis of the target object 3D shape data and illumination base data stored in the 3D model storage means 170. In this case, the comparison image generation means 110 generates, as the comparison image, an image obtained by assuming that the target object is in the position/posture given as the position/posture estimation value. As the position/posture estimation value, the position/posture initial value 12 or a position/posture estimation value calculated by the end determination means 140 (to be described later) is used.

The processing of generating the comparison image under an illumination condition equal or analogous to that for the input image is executed by, e.g., the following known method. For example, a texture representing the luminance at each position on the surface of the target object changes depending on the illumination condition. Various texture spaces generated by the illumination variation and the 3D shape data of the target object are registered in advance. On the basis of the registered texture spaces and 3D shape data, each texture space can be converted into an illumination variation space generated by the variation in illumination condition when the target object is in the necessary position/posture. The comparison image generation means 110 can generate the comparison image under an illumination condition equal or analogous to that for the input image by using this conversion method.

The method of generating a comparison image under the same or similar illumination condition (method of generating an image while reproducing the same or similar illumination condition) is described in, e.g., Japanese Patent Laid-Open No. 2002-157595 (to be referred to as reference 2 hereinafter).

The image displacement distribution detection means 120 is implemented by, e.g., the control unit of the computer 100. The image displacement distribution detection means 120 segments the comparison image generated by the comparison image generation means 110 into partial images each corresponding to a part (sub-region) with a predetermined size. The image displacement distribution detection means 120 compares the luminance value of each partial image with that of the input image and detects an image moving direction which maximizes the similarity between the superimposed images. That is, the image displacement distribution detection means 120 detects the image displacement distribution of each sub-region of the comparison image with respect to the input image (the positional relationship between the comparison image and the input image in each sub-region).

The image displacement distribution detection means 120 detects the image displacement distribution by using, e.g., an image displacement detection technique generally called optical flow. More specifically, the image displacement distribution detection means 120 detects the image displacement distribution between the comparison image and the input image by detecting the distribution of moving vectors representing the movement of the parts of the object in the image. An image displacement detection technique by optical flow is described in, e.g., J. L. Barron, D. J. Fleet, & S. S. Beauchemin, "Performance of Optical Flow Techniques", International Journal of Computer Vision, Netherlands, Kluwer Academic Publishers, 1994, 12:1, pp. 43-77.

The posture difference calculation means 130 is implemented by, e.g., the control unit of the computer 100. On the basis of the image displacement distribution of each sub-region calculated by the image displacement distribution detection means 120 and the 3D coordinate data (3D coordinate data corresponding to each sub-region) of each part of the 3D shape data of the target object, the posture difference calculation means 130 calculates a 3D motion (moving amount or rotation amount) which causes each part to be nearest to the displacement distribution when the target object is moved virtually. The posture difference calculation means 130 calculates the 3D motion calculation result as a position/posture difference value (correction amount).

Figure 4:
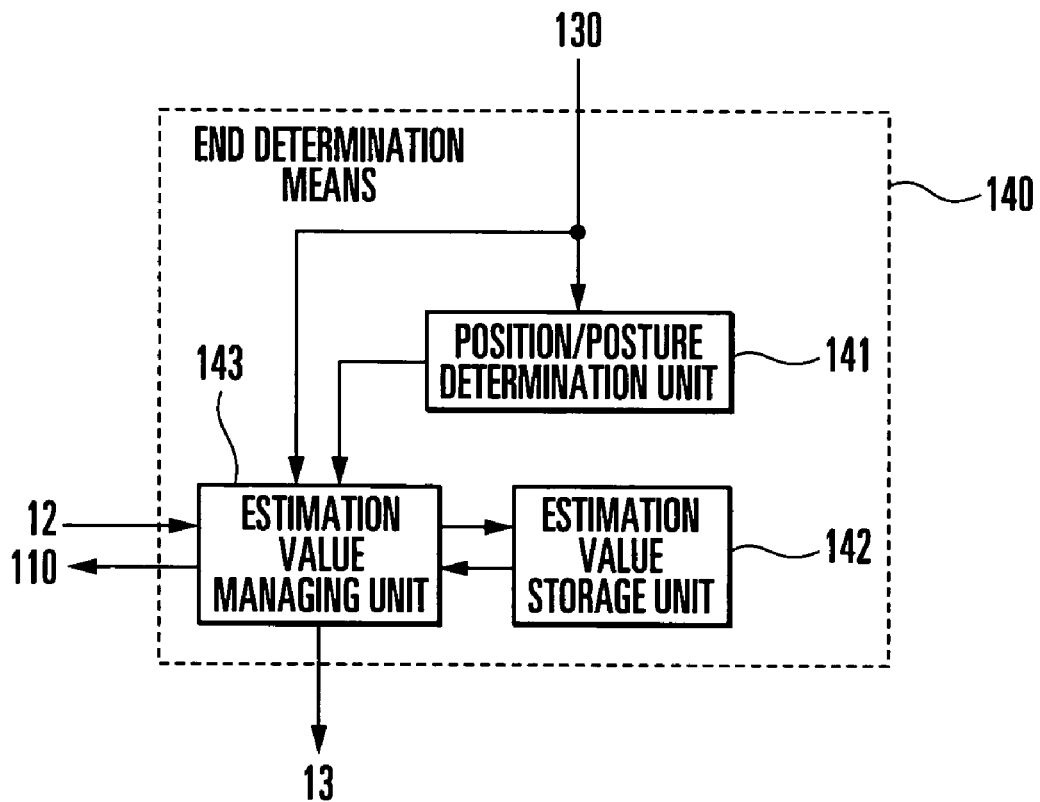
FIG. 4 is a block diagram showing an arrangement example of an end determination means.

The end determination means 140 includes a position/posture determination unit 141, estimation value storage unit 142, and estimation value managing unit 143, as shown in FIG. 4. The end determination means 140 is implemented by, e.g., the control unit and storage unit of the computer 100.

The position/posture determination unit 141 determines whether the position/posture of the target object, which is assumed when the comparison image generation means 110 generates the comparison image, is appropriate. Whether the position/posture is appropriate is determined on the basis of the magnitude relationship between a predetermined threshold value and the position/posture difference value calculated by the posture difference calculation means 130. If the position/posture difference value is smaller than the threshold value, it is determined that the current position/posture is appropriate. If the position/posture difference value is not smaller (equal to or larger) than the threshold value, it is determined that the current position/posture is not appropriate. The position/posture determination unit 141 outputs the determination result to the estimation value managing unit 143.

The estimation value storage unit 142 stores the current position/posture estimation value. More specifically, the estimation value storage unit 142 stores the position/posture initial value 12 as the initial value of the position/posture estimation value, and also, a new position/posture estimation value calculated by the estimation value managing unit 143 as will be described later.

The estimation value managing unit 143 executes the following processing in accordance with the determination result input from the position/posture determination unit 141. If the position/posture determination unit 141 determines that the current position/posture is appropriate, the current position/posture estimation value is the most accurate estimation value (value closest to the actual position/posture of the target object). The estimation value managing unit 143 reads out the current position/posture estimation value from the estimation value storage unit 142, outputs this estimation value as an optimum position/posture estimation value 13, and ends the processing. If the position/posture determination unit 141 determines that the current position/posture is not appropriate, the estimation value managing unit 143 reads out the current position/posture estimation value from the estimation value storage unit 142 and adds the position/posture difference value to each parameter of the estimation value, thereby calculating a new position/posture estimation value corrected from the current position/posture estimation value. This processing corresponds to correction of the target object position/posture assumed in generating the comparison image. The estimation value managing unit 143 also updates the contents stored in the estimation value storage unit 142 to the new position/posture estimation value and outputs the estimation value to the comparison image generation means 110. When the new position/posture estimation value is input to the comparison image generation means 110, the object position/posture estimation system repeats the series of processing operations from the comparison image generation processing by the comparison image generation means 110.

An image position relationship detection means is implemented by the image displacement distribution detection means 120. A correction amount calculation means is implemented by the posture difference calculation means 130. A state correction means is implemented by the estimation value managing unit 143. A state determination means is implemented by the position/posture determination unit 141.

In this embodiment, the storage device provided in the computer 100 stores programs to execute the target object position/posture estimation processing. For example, the storage device provided in the computer 100 stores an object state estimation program to cause the computer to execute processing of generating, as a comparison image, an image in which an object is set in a predetermined state (at least one of the position and posture) by using object 3D shape data stored in the database, processing of detecting the positional relationship between the input image and the generated comparison image for each sub-region, processing of calculating the correction amount of the object state in the comparison image by using the detected positional relationship for each sub-region, and processing of calculating a new object state by correcting the object state set upon comparison image generation by using the calculated correction amount. This estimation program may be recorded on an optical disk, magnetic disk, or other recording medium and provided.

Figure 5:
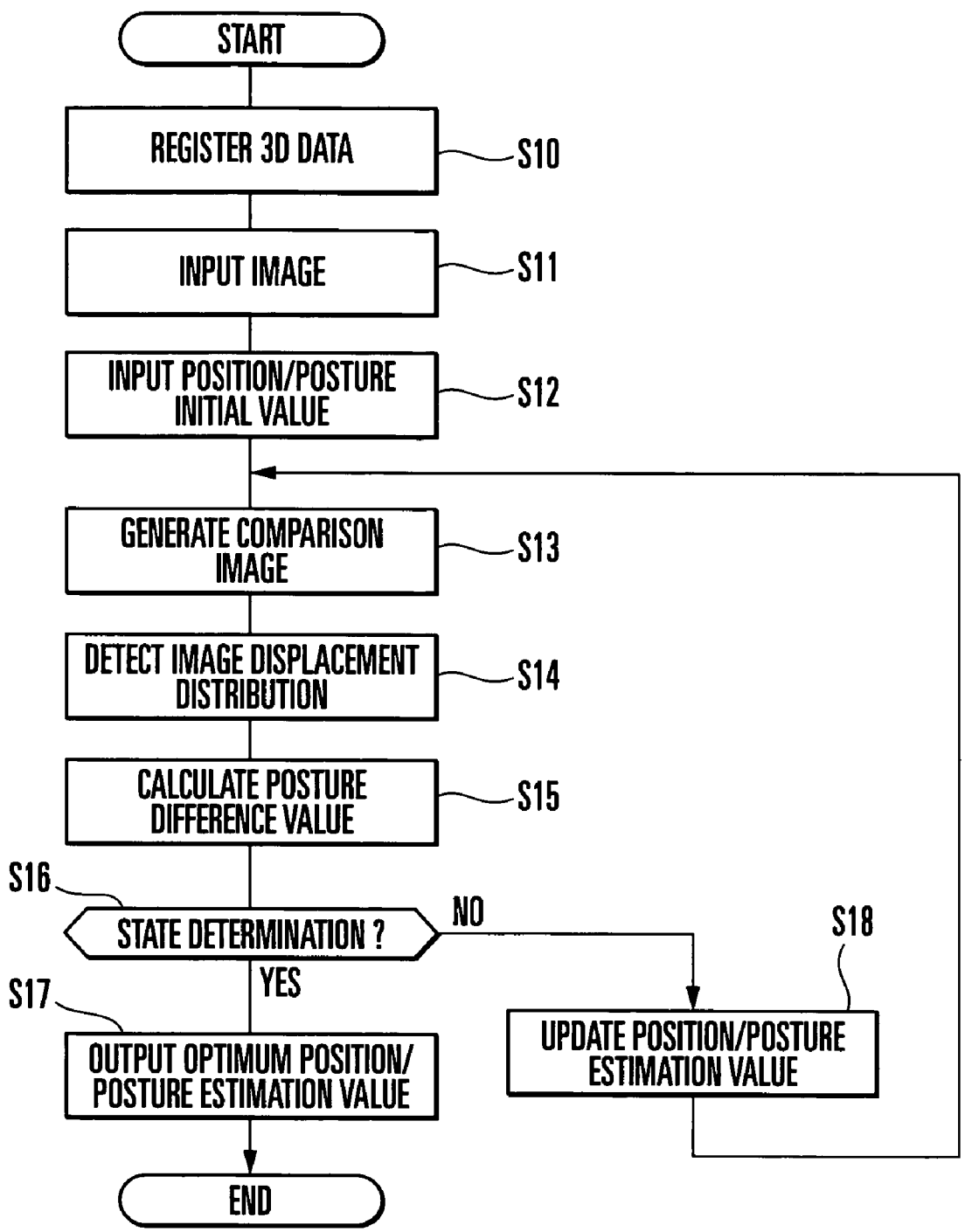
FIG. 5 is a flowchart showing an example of target object position/posture estimation processing executed by the object position/posture estimation system.

The operation will be described next. FIG. 5 is a flowchart showing an example of target object position/posture estimation processing executed by the object position/posture estimation system. The user of the object position/posture estimation system (to be simply referred to as a user hereinafter) operates the 3D shape measuring apparatus 200 (3D shape measuring means 150) to input in advance a measuring instruction of the 3D shape and surface reflectance of a target object whose position/posture is to be estimated. In accordance with the user operation, the 3D shape measuring means 150 measures the 3D shape and surface reflectance of the target object and generates 3D shape data and surface reflectance data.

If the 3D shape and surface reflectance are measured by measuring the target object from only one direction, an invisible region is produced. Hence, it may be impossible to measure the shape and surface reflectance of the whole object. In this case, the 3D shape data and surface reflectance data of the whole object are generated by measuring the target object even from other directions and integrating the measurement values.

On the basis of the 3D shape data and surface reflectance data generated by the 3D shape measuring means 150, the illumination base calculation means 160 calculates an illumination base image group representing a variation in luminance value of the target object image under various illumination conditions. The illumination base calculation means 160 stores the calculated illumination base image group in the 3D model storage means 170 as illumination base data. The illumination base calculation means 160 also stores the 3D shape data from the 3D shape measuring means 150 in the 3D model storage means 170 together with the illumination base data (step S10).

The user senses the target object by operating the camera 300 (image input means 180). The image input means 180 senses an object including the target object whose position/posture is to be estimated and generates the input image data 11 in accordance with the user operation (step S11). The image input means 180 outputs the generated input image data 11 to the computer 100.

The user inputs and designates a value representing a rough position/posture of the target object in the input image while observing it. The image input means 180 outputs the value of the rough position/posture input and designated by the user to the computer 100 as the position/posture initial value 12 (step S12). The position/posture initial value 12 is input to the comparison image generation means 110 and stored in the estimation value storage unit 142 of the end determination means 140.

Instead of causing the user to manually input and designate the position/posture initial value 12 while observing the input image, an estimation value output from another estimation apparatus/system may be input to the object position/posture estimation system. For example, if an estimation apparatus/system capable of estimating the position/posture of a target object without inputting an initial value (e.g., an apparatus using a sensor to detect a rough rotation angle of an object) is present, an estimation value output from the estimation apparatus/system may be input to the object position/posture estimation system. In this case, an accurate position/posture of the target object can be estimated without manually inputting an initial value.

The comparison image generation means 110 extracts the target object 3D shape data and illumination base data stored in advance in the 3D model storage means 170. The comparison image generation means 110 also receives the input image data 11 from the image input means 180. The comparison image generation means 110 generates, as a comparison image, a target object image under an illumination condition equal or analogous to that for the input image on the basis of the 3D shape data, illumination base data, and input image data 11 assuming that the target object is in the position/posture given as the position/posture initial value 12 (step S13).

The image displacement distribution detection means 120 segments the comparison image generated by the comparison image generation means 110 into partial images each corresponding to a part with a predetermined size. The image displacement distribution detection means 120 compares the luminance values by superimposing each partial image on the input image and detects, as an image displacement distribution, an image moving direction which maximizes the similarity between the images on the screen (step S14). The image displacement distribution detection means 120 may detect the image displacement distribution by segmenting the input image into partial images and comparing the luminance values by superimposing each partial image on the comparison image.

On the basis of the image displacement distribution detected by the image displacement distribution detection means 120 and the 3D coordinate data (data corresponding to each sub-region) of each part contained in the 3D shape data of the target object, the posture difference calculation means 130 calculates the 3D motion of the target object, which causes each part to be nearest to the displacement distribution when the target object is moved virtually. The posture difference calculation means 130 calculates the 3D motion calculation result as a position/posture difference value (step S15).

In the end determination means 140, The position/posture determination unit 141 determines whether the position/posture of the target object, which is set when the comparison image generation means 110 generates the comparison image, is appropriate (step S16). More specifically, when the position/posture difference value calculated by the posture difference calculation means 130 is smaller than a predetermined threshold value, it is determined that the current position/posture is appropriate (YES in step S16). In this case, the estimation value managing unit 143 reads out the current position/posture estimation value from the estimation value storage unit 142 and outputs the estimation value as the optimum position/posture estimation value 13 (step S17). The processing is ended.

When the position/posture difference value is not smaller than the predetermined threshold value, the position/posture determination unit 141 determines that the current position/posture is not appropriate (step S16). In this case, the estimation value managing unit 143 reads out the current position/posture estimation value from the estimation value storage unit 142 and adds the position/posture difference value to each parameter of the estimation value, thereby calculating a new position/posture estimation value. The estimation value managing unit 143 also updates the contents stored in the estimation value storage unit 142 to the new position/posture estimation value and outputs the estimation value to the comparison image generation means 110 (step S18).

The computer 100 repeatedly executes the processing in steps S13, S14, S15, S16, and S18 until it is determined in step S16 that the position/posture difference value is smaller than the predetermined threshold value.

As described above, according to this embodiment, the object position/posture estimation system comprises the image displacement distribution detection means 120 and posture difference calculation means 130. The comparison image and input image are segmented into partial images sub-regions each having a predetermined size. The luminance value of the comparison image and that of the input image are compared for each partial image to detect a 2D positional shift. The object position/posture estimation system operates such that the 3D position/posture difference value of the position/posture of the target object is calculated on the basis of the positional shift distribution and the target object 3D shape model registered in advance, and the position/posture estimation value is updated by adding the position/posture difference value to the current position/posture estimation value.

With the above-described arrangement, the object position/posture estimation system updates the position/posture estimation value such that it converges from an initial value containing an error to the actual position/posture in a minimum distance. In this embodiment, it is unnecessary to generate a number of position/posture estimation values, generate comparison images based on all the estimation values, and compare them with the input image. The number of times of comparison image generation and the complexity in calculating the position/posture estimation value of the target object can be reduced as compared to the conventional position/posture recognition apparatus. Hence, the position or posture of an object contained in an image can quickly be estimated.

An example will be described in which the initial position/posture estimation value input in advance is shifted, from the actual position/posture of the target object, by 1 mm, 2 mm, and 3 mm in translation in the X-, Y-, and Z-axis directions and by 6°, 4°, and 2° in rotation about the X-, Y-, and Z-axes. In the conventional position/posture recognition apparatus, the optimum direction and amount of parameter change from the initial value are unknown. The conventional position/posture recognition apparatus searches for the estimation value while, e.g., changing the parameters in a step of 1 mm in the translational direction and in a step of 2° in the rotational direction.

In this case, the position/posture recognition apparatus must execute search processing a minimum of 12 times in total (1+2+3=6 times in the translational direction and 3+2+1=6 times in the rotational direction). More specifically, the position/posture recognition apparatus need to execute each of reproduced image (comparison image) generation processing and similarity calculation processing between the input image and the reproduced image a minimum of 12 times. In actual processing, to determine whether the error between the estimation value and the actual position/posture at a position is minimum, search must be continued to a position/posture of one more step from the minimum point of the image reproduction error. Hence, the position/posture recognition apparatus must execute search processing a minimum of 12+6=18 times.

According to this embodiment, the object position/posture estimation system generates a comparison image under an illumination condition equal or analogous to that for the input image on the basis of a registered 3D shape model and illumination base data by using position/posture parameters input as an initial value. The object position/posture estimation system also segments a region containing the target object on the image into blocks with a predetermined size and detects the 2D shift direction between the blocks of the comparison image and input real image (a moving amount which minimizes the luminance value difference between the comparison image and the input image when each part is shifted on the image in the vertical and horizontal directions and compared, i.e., an image displacement distribution). The object position/posture estimation system updates the position/posture estimation value in a direction to optimally correct the detected image displacement distribution so that the six parameters of the position/posture can be updated simultaneously. Hence, an accurate position/posture estimation value can be obtained by a few number of times of search, and the complexity for estimation value calculation can be reduced as compared to the conventional position/posture recognition apparatus.

Second Embodiment

Figure 6:
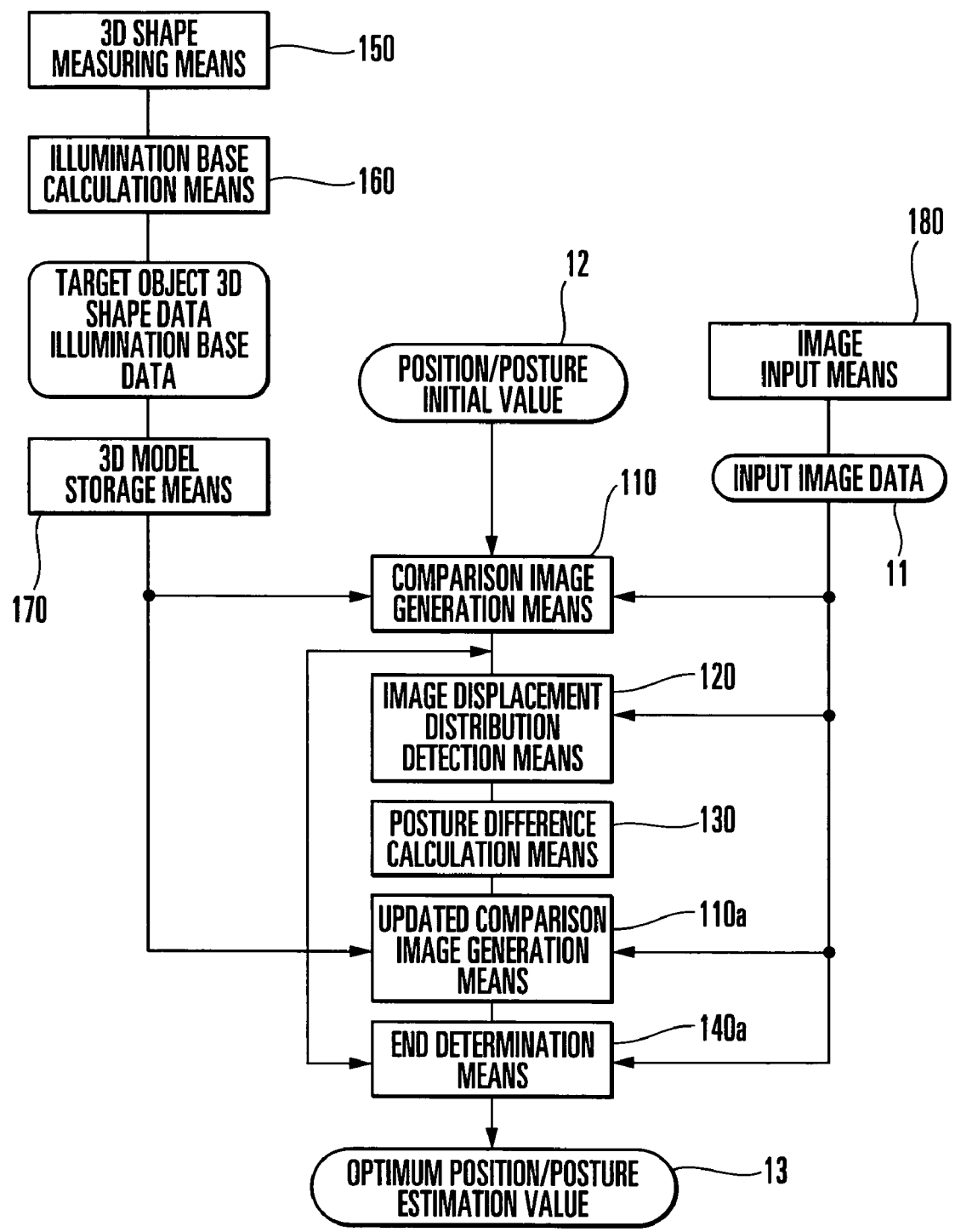
FIG. 6 is a block diagram showing another arrangement example of the object position/posture estimation system.

The second embodiment of the present invention will be described next with reference to the accompanying drawings. FIG. 6 is a block diagram showing another arrangement example of an object position/posture estimation system. As shown in FIG. 6, in the object position/posture estimation system, the end determination means 140 of the first embodiment is replaced with an end determination means 140*a*, and an updated comparison image generation means 110*a* is added. The remaining constituent elements are the same as in the first embodiment.

The updated comparison image generation means 110*a* is implemented by, e.g., the control unit of a computer 100. When a posture difference calculation means 130 calculates the position/posture difference value, the updated comparison image generation means 110*a* reads out the current position/posture estimation value from the end determination means 140*a* and adds the position/posture difference value to the estimation value, thereby calculating a new position/posture estimation value. This processing is the same as that executed by the estimation value managing unit 143 in the first embodiment. On the basis of the 3D shape data of the target object and illumination base data, the updated comparison image generation means 110*a* generates, as an updated comparison image, an image under an illumination condition equal or analogous to that for the input image assuming that the target object is in the position/posture of the new position/posture estimation value. The new position/posture estimation value and updated comparison image are output to the end determination means 140*a*.

Figure 7:
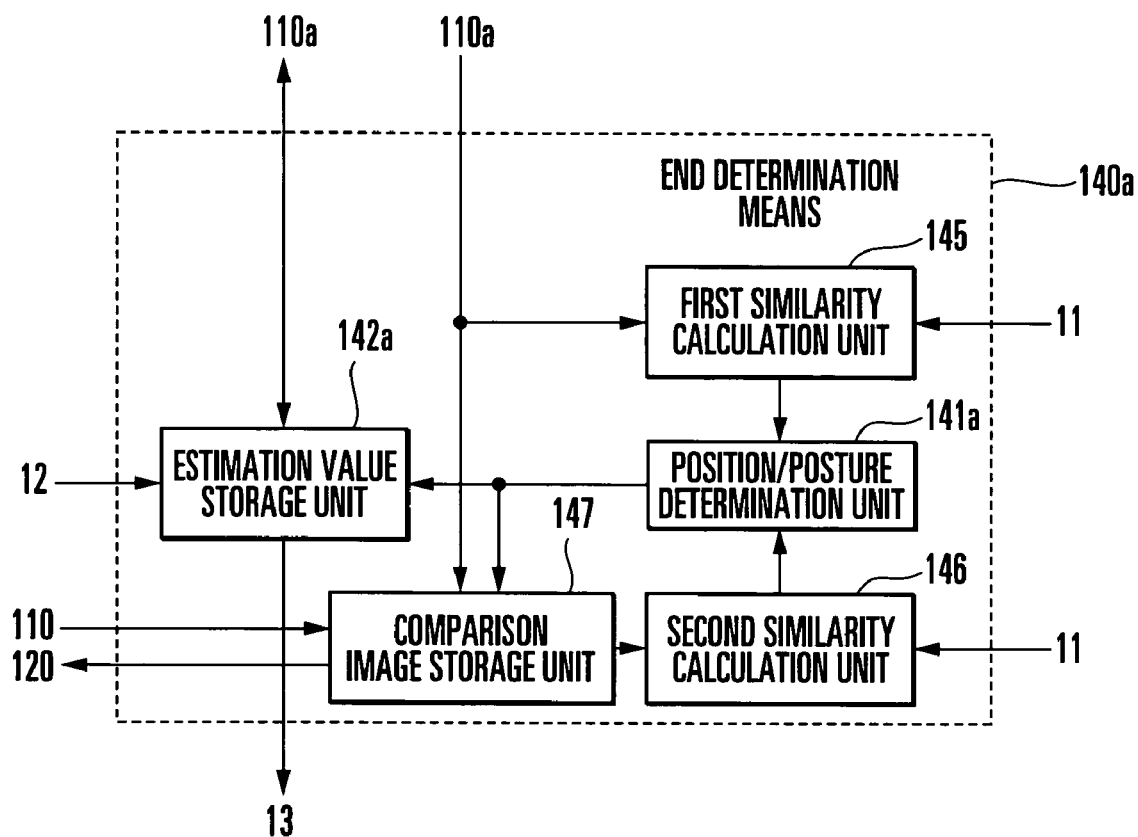
FIG. 7 is a block diagram showing an arrangement example of the end determination means.

As shown in FIG. 7, the end determination means 140*a* includes a position/posture determination unit 141*a*, estimation value storage unit 142*a*, first similarity calculation unit 145, second similarity calculation unit 146, and comparison image storage unit 147 and is implemented by, e.g., the control unit and storage unit of the computer 100.

The first similarity calculation unit 145 calculates the first similarity (to be referred to as a similarity after update hereinafter) between the input image and the updated comparison image generated by the updated comparison image generation means 110*a*. The second similarity calculation unit 146 calculates the second similarity (to be referred to as a similarity before update hereinafter) between the input image and the current comparison image stored in the comparison image storage unit 147, as will be described later.

The position/posture determination unit 141*a* compares the similarity after update with the similarity before update, thereby determining whether the position/posture of the target object, which is assumed when the comparison image generation means 110 and updated comparison image generation means 110*a* generate the comparison image and update comparison image, is appropriate. More specifically, if the similarity after update is higher than the similarity before update, it is determined that the current position/posture is not appropriate. If the similarity after update is not higher (equal to or lower) than the similarity before update, it is determined that the current position/posture is appropriate. The determination result is output to the estimation value storage unit 142*a* and comparison image storage unit 147.

The comparison image storage unit 147 stores the current comparison image. The comparison image storage unit 147 stores first the comparison image generated by the comparison image generation means 110 and then the updated comparison image generated by the updated comparison image generation means 110*a*. If the position/posture determination unit 141*a* determines that the current position/posture is not appropriate, the comparison image storage unit 147 updates the stored contents to a new updated comparison image and outputs the new updated comparison image to an image displacement distribution detection means 120.

The estimation value storage unit 142*a* stores the current position/posture estimation value. More specifically, the estimation value storage unit 142*a* stores a position/posture initial value 12 as the initial value of the position/posture estimation value and then a new position/posture estimation value calculated by the updated comparison image generation means 110*a*. If the position/posture determination unit 141*a* determines that the current position/posture is not appropriate, the estimation value storage unit 142*a* updates the stored contents to a new position/posture estimation value. If the position/posture determination unit 141*a* determines that the current position/posture is appropriate, the estimation value storage unit 142*a* outputs the current position/posture estimation value as an optimum position/posture estimation value 13 and ends the processing.

Figure 8:
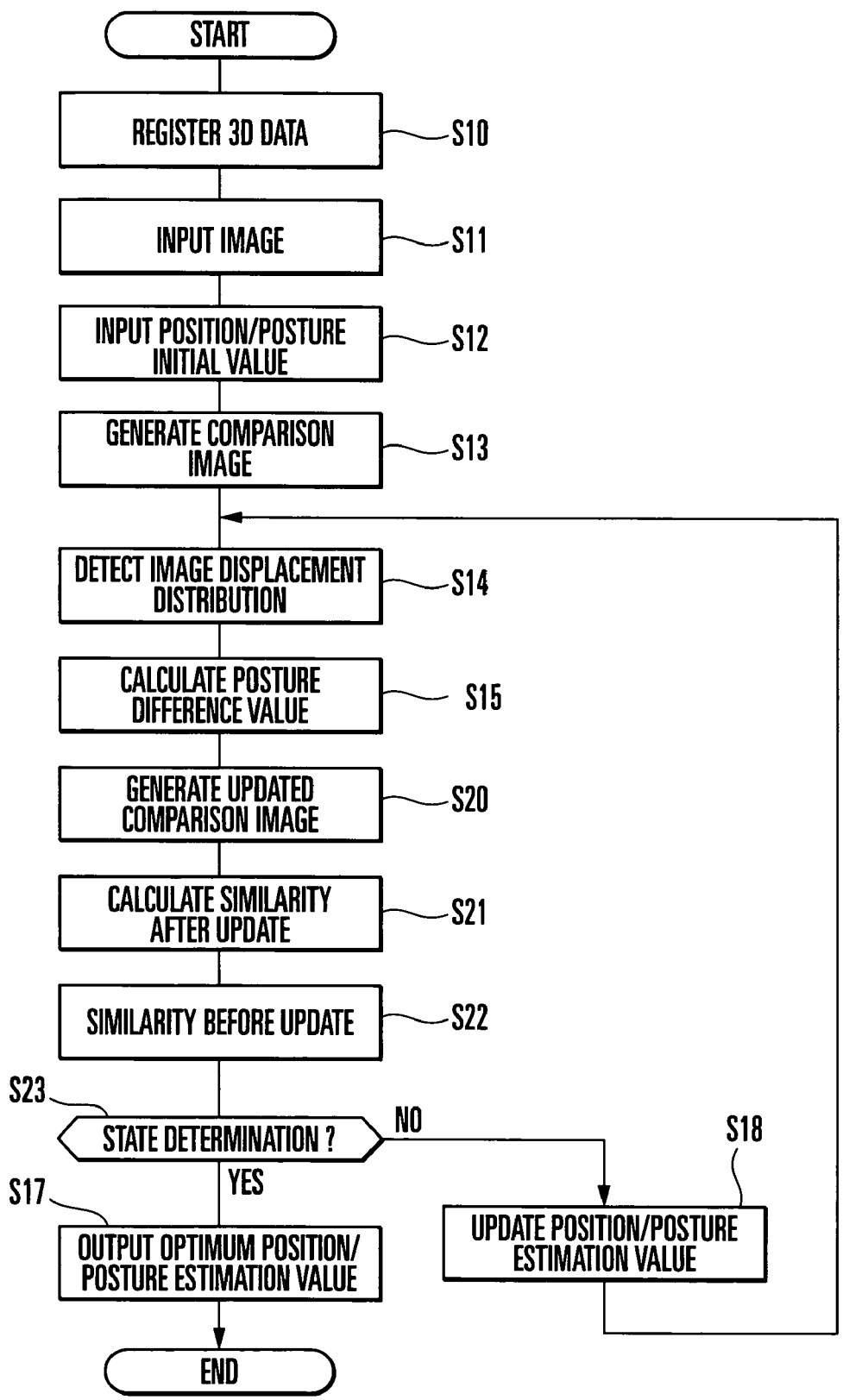
FIG. 8 is a flowchart showing another example of target object position/posture estimation processing executed by the object position/posture estimation system.

FIG. 8 is a flowchart showing another example of target object position/posture estimation processing executed by the object position/posture estimation system. Processing in steps S10 to S15 in FIG. 8 is the same as in the first embodiment. In this embodiment, processing in steps S20 to S22 is executed in addition to the processing of the first embodiment. The contents of state determination processing in step S23 are different from those of the first embodiment, as shown in FIG. 8.

When the position/posture difference value is calculated in step S15, the updated comparison image generation means 110*a* adds the position/posture difference value to the current position/posture estimation value, thereby calculating a new position/posture estimation value. On the basis of the 3D shape data of the target object, illumination base data, and input image data 11, the updated comparison image generation means 110*a* generates, as an updated comparison image, an image under an illumination condition equal or analogous to that for the input image assuming that the target object is in the position/posture of the new position/posture estimation value (step S20). Whether to employ the new position/posture estimation value and updated comparison image as data to be used in subsequent processing is determined by the end determination means 140*a* by comparing the similarities of the images before and after update, as will be described later.

In the end determination means 140*a*, the first similarity calculation unit 145 calculates the similarity between the input image and the updated comparison image generated by the updated comparison image generation means 110*a*, i.e., the similarity after update (step S21). The second similarity calculation unit 146 calculates the similarity between the input image and the current comparison image based on the current position/posture estimation value, i.e., the similarity before update (step S22).

The position/posture determination unit 141*a* compares the similarity after update with the similarity before update. If the similarity after update is higher than the similarity before update, the position/posture determination unit 141*a* determines that the current position/posture is not appropriate (NO in step S23). The new position/posture estimation value calculated by the updated comparison image generation means 110*a* replaces the current position/posture estimation value and is determined as a position/posture estimation value to be used in subsequent processing (step S18). In this case, the updated comparison image generated by the updated comparison image generation means 110*a* replaces the current comparison image and is determined as a comparison image to be used in subsequent processing. The computer 100 repeatedly executes the processing in steps S14, S15, S20, S21, S22, S23, and S18 until the similarity after update becomes equal to or lower than the similarity before update.

If the similarity after update is not higher than the similarity before update, the position/posture determination unit 141*a* determines that the current position/posture is appropriate (YES in step S23). The current position/posture estimation value (position/posture estimation value before update) is output as the final optimum position/posture estimation value 13 (step S17), and the processing is ended.

As described above, according to this embodiment, although the number of processing steps increases, estimation processing can be done such that the comparison image becomes nearer to the input image even when the position/posture difference value is small, as compared to the first embodiment. Hence, as compared to the first embodiment, the position/posture estimation value can further be narrowed down, and the accuracy of the final position/posture estimation value can be increased.

Third Embodiment

Figure 9:
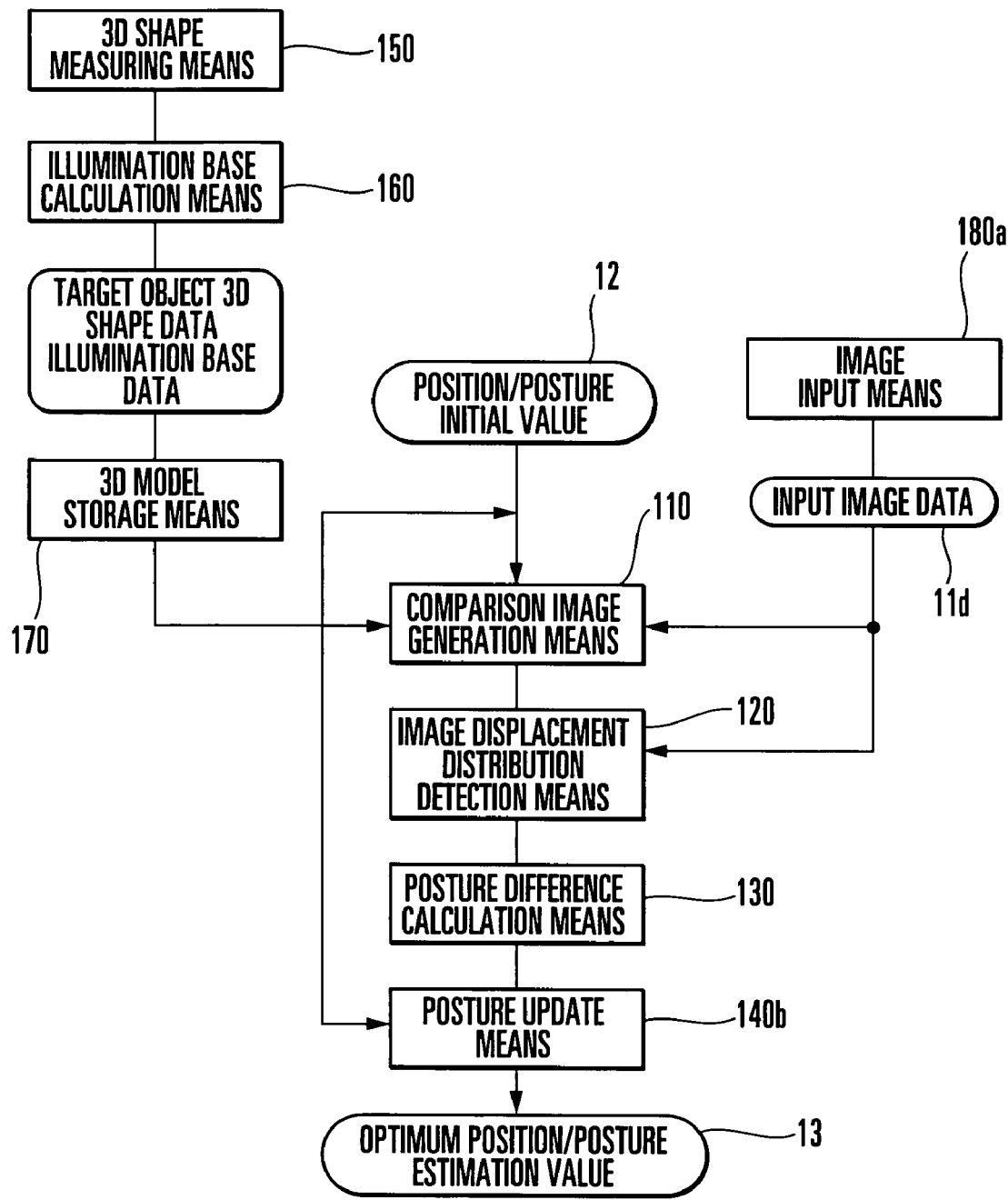
FIG. 9 is a block diagram showing still another arrangement example of the object position/posture estimation system.

The third embodiment of the present invention will be described below with reference to the accompanying drawings. FIG. 9 is a block diagram showing still another arrangement example of an object position/posture estimation system. As shown in FIG. 9, in the object position/posture estimation system, an image input means 180a is used in place of the image input means 180 of the components of the first embodiment, and a posture update means 140b is used in place of the end determination means 140.

In this embodiment, an image containing a target object whose position/posture estimation value is to be estimated is not a still image but a moving image. The object position/posture estimation system continuously outputs a position/posture estimation value as needed as the target object moves. In this embodiment, the image input means 180a is implemented by a moving image sensing means such as a video camera. The posture update means 140b is implemented by, e.g., the control unit and storage unit of a computer 100. In this embodiment, an example will be described in which the target object is a human face. The remaining constituent elements are the same as in the first embodiment.

Figure 10:
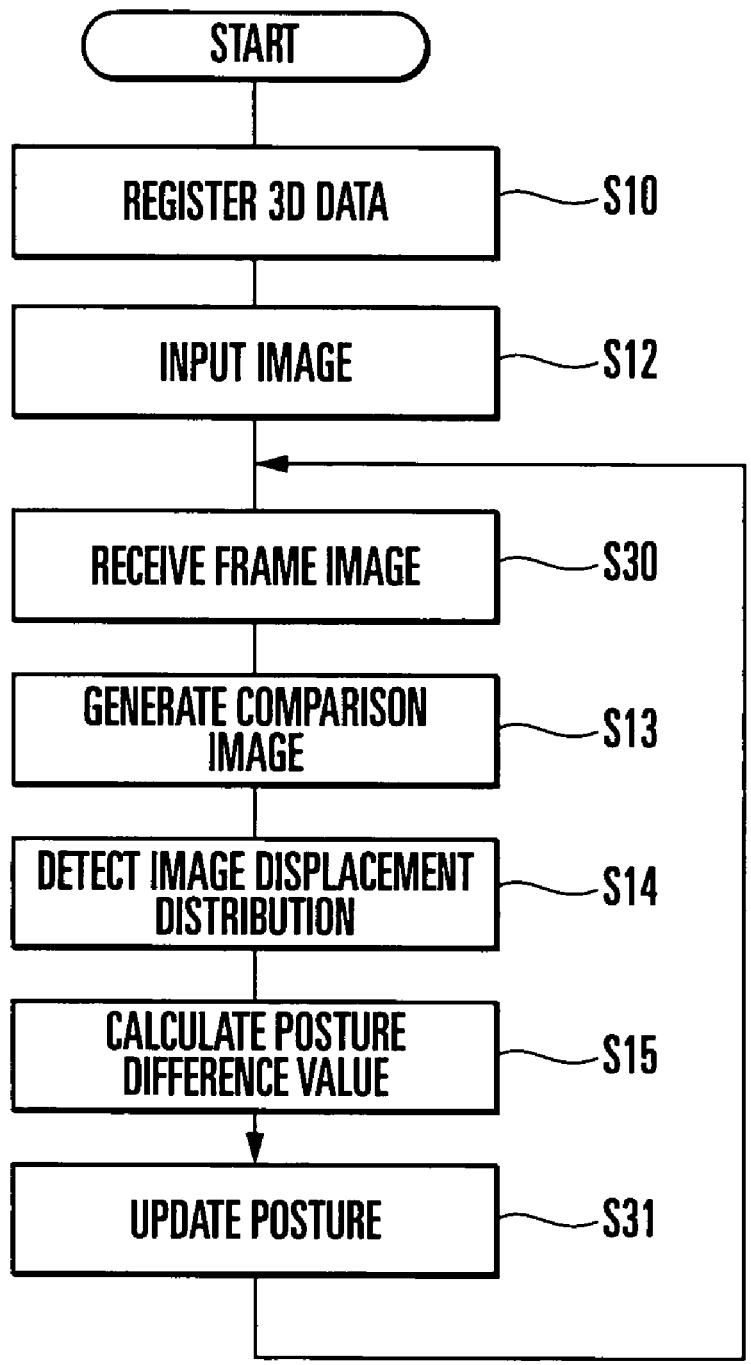
FIG. 10 is a flowchart showing still another example of target object position/posture estimation processing executed by the object position/posture estimation system.

FIG. 10 is a flowchart showing still another example of target object position/posture estimation processing executed by the object position/posture estimation system. In this embodiment, processing in step 30 to receive one (latest frame image) of still images (frame images) contained in a moving image at each processing time is executed in addition to the processing of the first embodiment. Posture update processing in step S31 is executed instead of state determination processing in step S16.

As in the first embodiment, when illumination base data is generated, an illumination base calculation means 160 stores the 3D shape data and illumination base data in a 3D model storage means 170 (step S10). The user inputs and designates a rough position/posture of a human face in the first frame image contained in a moving image while observing it. The image input means 180a outputs the rough position/posture input and designated by the user to the computer 100 as a position/posture initial value 12 (step S12).

A comparison image generation means 110 receives the frame image at the present time from the image input means 180a as input image data 11a (step S30). As in the first embodiment, the comparison image generation means 110 generates a comparison image (step S13). An image displacement distribution detection means 120 detects an image displacement distribution (step S14). A posture difference calculation means 130 calculates a posture difference value (step S15). The processing contents in steps S13 to S15 are the same as in the first embodiment.

The posture update means 140b updates the position/posture estimation value by adding the position/posture difference value calculated by the posture difference calculation means 130 to the current position/posture estimation value (step S31). In this case, the posture update means 140b outputs the updated position/posture estimation value as an optimum position/posture estimation value 13 at the present time in every updating. The computer 100 repeatedly executes the processing in steps S30, S13, S14, S15, and S31 until the moving images finishes.

As described above, according to this embodiment, the position/posture of a moving target object, which changes with the passage of time, can be estimated in real time. The position/posture is always updated by comparing the comparison image generated on the basis of the current position/posture estimation value with a frame image contained in the current moving image. Hence, position/posture estimation processing can accurately be performed for a long time without accumulating errors.

Fourth Embodiment

Figure 11:
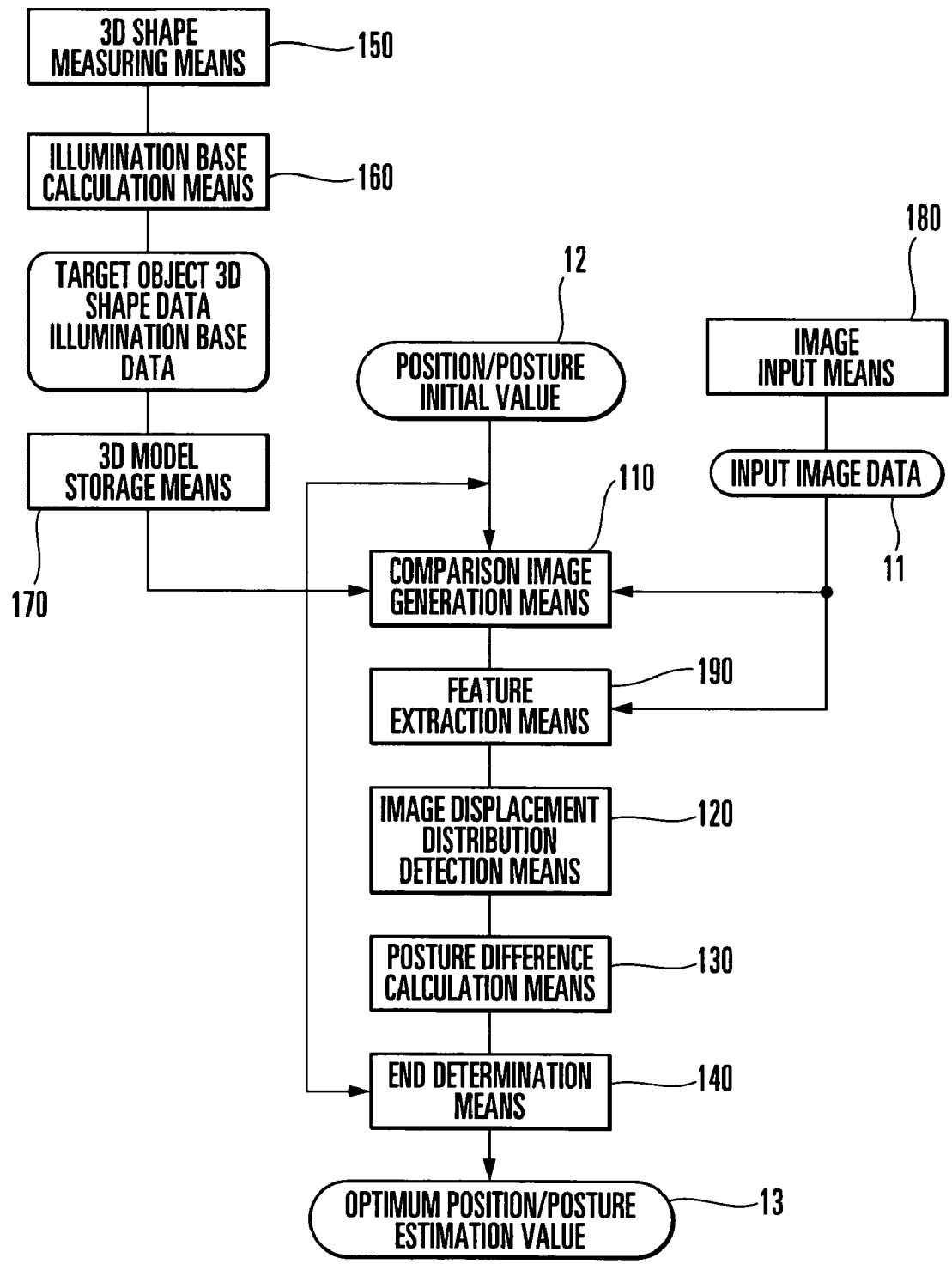
FIG. 11 is a block diagram showing still another arrangement example of the object position/posture estimation system.

The fourth embodiment of the present invention will be described below with reference to the accompanying drawings. FIG. 11 is a block diagram showing still another arrangement example of an object position/posture estimation system. As shown in FIG. 11, the object position/posture estimation system includes a feature extraction means 190 in addition to the components of the first embodiment. The remaining constituent elements are the same as in the first embodiment.

The feature extraction means 190 is implemented by, e.g., the control unit of a computer 100. A feature amount extraction means is implemented by the feature extraction means 190.

Figure 12:
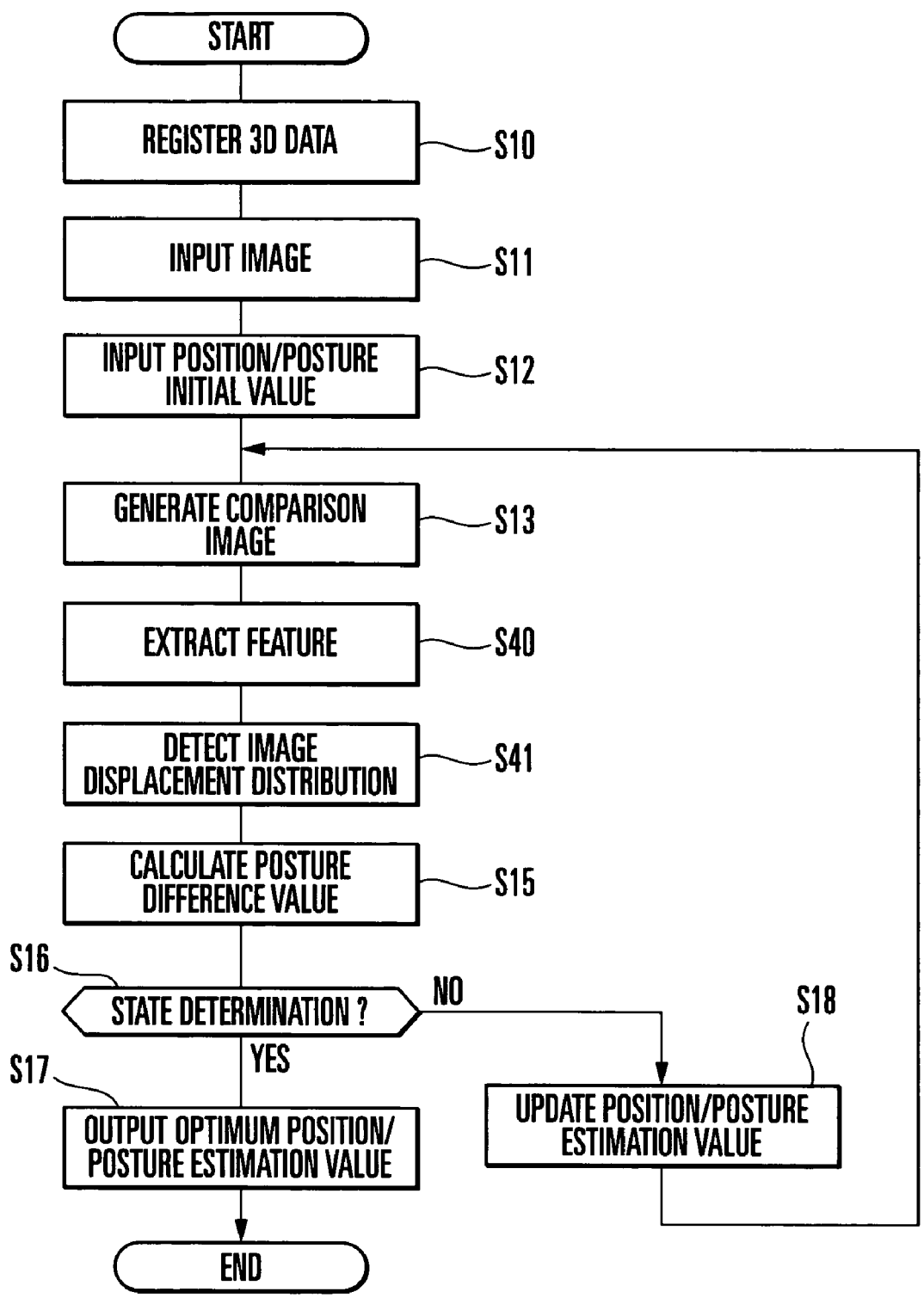
FIG. 12 is a flowchart showing still another example of target object position/posture estimation processing executed by the object position/posture estimation system.

FIG. 12 is a flowchart showing still another example of target object position/posture estimation processing executed by the object position/posture estimation system. In this embodiment, an image displacement distribution is detected by extracting an image feature amount suitable for positional shift detection by using a filter instead of detecting an image shift by directly comparing the image luminance value of the comparison image and that of the input image. In this embodiment, a case will be described in which an edge feature amount is used as an image feature amount. Not the edge feature amount but any other feature amount such as a Gabor feature amount may be used as the image feature amount.

Processing in steps S10 to S13 in FIG. 12 is the same as in the first embodiment. When a comparison image generation means 110 generates a comparison image, the feature extraction means 190 generates, by using an edge detection filter, an edge image as an image feature amount for each of the comparison image and input image (step S40).

The feature extraction means 190 comprises an edge detection filter for the vertical direction of the image and an edge detection filter for the horizontal direction of the image. In step S40, the feature extraction means 190 generates a vertical edge image (to be referred to as a vertical edge hereinafter) and horizontal edge image (to be referred to as a horizontal edge hereinafter) of the comparison image and vertical and horizontal edges of the input image by separately using the vertical and horizontal edge detection filters. That is, the feature extraction means 190 generates four edge images in step S40.

An image displacement distribution detection means 120 generates partial edge images by segmenting the vertical and horizontal edges of the comparison image into parts with a predetermined size. The image displacement distribution detection means 120 compares each partial edge image with the vertical and horizontal edges of the input image by superimposing them. The image displacement distribution detection means 120 checks a moving direction which increases the similarity on the screen and outputs the direction which increases the similarity as an image displacement distribution (step S41).

In step S41, since a horizontal image shift can clearly be detected by comparing vertical edge images, the image displacement distribution detection means 120 detects a horizontal image displacement by comparing the vertical edges of the comparison image and input image. Since a vertical image shift can clearly be detected by comparing horizontal edge images, the image displacement distribution detection means 120 detects a vertical image displacement by comparing the horizontal edges of the comparison image and input image. When an optimum image feature amount is used to detect the positional shift in each direction, the image displacement distribution detection accuracy can be increased.

Processing in steps S15 to S18 is the same as in the first embodiment.

As described above, according to this embodiment, an image displacement as the image positional shift of each part is detected by using an image feature amount which enables more sensitive positional shift detection than a luminance value instead of directly comparing the image luminance value of the comparison image and that of the input image. For this reason, the image displacement can accurately be detected as compared to use of a luminance value. Hence, the accuracy of the calculated position/posture difference value can be increased, and the accuracy of the finally obtained position/posture estimation value can be increased.

Fifth Embodiment

A detailed example of the first embodiment will be described as the fifth embodiment. In this embodiment, an object position/posture estimation system comprises a 3D shape measuring apparatus 200 to measure the 3D shape of a target object which is to be registered in advance, a camera 300 which senses an object including the target object whose position/posture is to be estimated, and a personal computer (computer 100) serving as a data processing apparatus/data storage apparatus. In this embodiment, an example will be described in which the target object whose position/posture is to be estimated is a human face.

(3D Shape Data Registration Processing)

Processing of the system preparation stage, i.e., 3D shape data registration processing in step S10 will be described first. In the 3D shape data registration processing shown in FIG. 5, the 3D shape of the target object (specific human face in this embodiment) whose position/posture is to be estimated and illumination base data representing a change in luminance value depending on an arbitrary illumination condition on the surface of the target object are stored in a storage device provided in the computer 100, as described above.

The user instructs to measure the 3D shape and surface reflectance of the face by operating the 3D shape measuring apparatus 200. The computer 100 for data processing receives 3D shape data and surface reflectance data (or image data corresponding to surface reflectance data) from the 3D shape measuring apparatus 200.

On the basis of the 3D shape data and surface reflectance data (or image data), the computer 100 calculates an illumination base group representing an illumination variation in luminance of the face surface. The computer 100 stores the calculated illumination base group in, e.g., the storage device as illumination base data. In this case, the computer 100 generates the illumination base group by using the following technique. The illumination base group generation technique is not limited to the technique of this embodiment. Various illumination base group generation techniques can be used in accordance with the comparison image generation algorithm (to be described later).

In this embodiment, a method of correcting a variation in illumination condition in the 3D shape data registration processing in step S10 and the comparison image generation processing in step S13 will be described. If the change in illumination condition is small or zero, correction processing may be omitted. In this case, the computer 100 may store the luminance value of each point on the surface of the target object directly in, e.g., the storage device without calculating the illumination base group.

A texture coordinate system to calculate an illumination base texture is defined as follows with respect to the surface of the 3D shape data. In this example, the 3D shape data contains coordinate data of each point on the object surface as 3D coordinates (x,y,z) with the origin set at the barycenter of the target object. That is, the 3D shape data is a set of coordinate data of points on the object surface. In this case, a sphere surrounding an object with its center located at the object barycenter is defined. The projective point of a point P to the spherical surface is set to Q. The latitude and longitude (s,t) of the point Q are defined as the texture coordinates of each point P on the object surface. The illumination base group may be calculated by using any other coordinate systems in accordance with the object shape.

The computer 100 calculates a luminance $I_i(s,t)$ of each point on the object surface under various illumination conditions i. In setting the illumination condition, for example, assume that one point source of light is placed at infinity. The latitude and longitude are changed every 10° interval from −90° to +90° to obtain 19×19=361 direction vectors $L_i$. On the basis of the direction vectors $L_i$, the illumination condition for light irradiation is set. The irradiation direction and the number of irradiation directions can be set arbitrarily. Letting N(s,t) be the normal vector, and r(s,t) be the surface reflectance data. The luminance $I_i(s,t)$ of each point of the object surface is given by $$I_i(s,t)=r(s,t)\Sigma_i(S(s,t,\vec{L_i})\max \vec{L_i}\cdot \vec{N_i}(s,t),0) \quad \text{[Equation 1]}$$

where S(s,t,L) represents the cast shadow (shadow). The value S(s,t,L) is 0 when the object surface is present between each point (s,t) and the light source at infinity of the direction vector $L_i$ (the luminance value is 0 because of the shadow) and 1 when no object surface is present. The shadow determination method can be implemented by a known technique in the field of computer graphics, e.g., ray tracing.

Next, the computer 100 calculates a base texture group capable of reproducing the luminance value of the object surface under an arbitrary illumination condition. The computer 100 generates a vector by arranging, in order for all points, luminance values calculated by using equation 1 for the points (s,t) of the object surface under the point source of light in the direction $L_i$ ($L_i$ is a vector). The vector obtained by arranging the luminance values in order is set to a sample texture $I_i$ ($I_i$ is a vector). A covariance matrix V of a sample texture group $\{I_i\}$ (i=1, 2, ..., 361) can be calculated by equation 3. S in equation 3 represents the sample texture group $\{I_i\}$ (i=1, 2, ..., 361) which is given by equation 2.

$$S = [\vec{I_1}\ \vec{I_2}\ \cdots\ \vec{I_{361}}] \quad \text{[Equation 2]}$$

$$V = \frac{1}{361}SS^T \quad \text{[Equation 3]}$$

The computer 100 calculates 10 eigenvalues ($\sigma_j$) and eigenvectors ($G_j$) of the covariance matrix V in descending order of eigenvalues. In this case, the computer 100 generates an eigenvector group $\{G_j\}$ (j=1, 2, ..., 10) as the illumination base group and stores it in, e.g., the storage device. Calculation of 10 values is a mere example. The number of calculated eigenvalues and eigenvectors may be larger or smaller than 10.

The above-described illumination base group calculation method is described in, e.g., reference 2.

Processing of causing the object position/posture estimation system to estimate the position/posture of an object on the basis of an image will be described next in order.

(Image Input Processing)

The user senses the target object whose position/posture is to be estimated by operating an image sensing device such as the camera 300. The computer 100 captures the input image data from the camera 300. Instead of capturing the image sensed by the camera 300, the computer 100 may read image data from a storage medium or receive image data from another computer through a communication network.

In this embodiment, the target object is assumed to almost face the front of the camera 300 and have a posture variation of about 10° in the vertical and horizontal directions. The target object lies at a point spaced apart from the camera 300 by about 50 cm. The target object (human face in this example) lies almost at the center of the camera 300 and has a position variation of about 10 cm. In this embodiment, a value obtained when the target object faces the front of the camera 300 and lies at the center of its screen while being spaced apart by 50 cm is always used as a position/posture initial value.

(Comparison Image Generation Processing)

The computer 100 reads 3D shape data and illumination base data stored in advance in, e.g., the storage device. The computer 100 generates, as a comparison image, a target object image under the same illumination condition as that for the input image assuming that the target object is in the position/posture of the current position/posture initial value. In this case, the computer 100 generates the comparison image by using the following technique. The comparison image generation technique is not limited to the technique of this embodiment. Various comparison image generation techniques can be used in accordance with the method used to calculate the illumination base data.

Let [X Y Z 1] be the coordinates of the 3D data of a point on the object surface, [U V] be the coordinates on the comparison image corresponding to the point, [u v w] be the homogeneous coordinates, K be a 3×3 matrix representing the internal parameters (pixel size and image center) of the camera 300, T be the vector representing translation of the object position, and R be the rotation matrix representing the posture variation of the object. The homogeneous coordinates [u v w] are calculated by using equation 5. The coordinates [U V] are calculated by using equation 4. The matrix M in equation 4 represents the momentum of the rotation and translation of the object and is calculated by using equation 6.

$$\begin{bmatrix} U \\ V \end{bmatrix} = \begin{bmatrix} \frac{u}{w} \\ \frac{v}{w} \end{bmatrix}$$ [Equation 4]

$$\begin{bmatrix} u \\ v \\ w \end{bmatrix} = KM \begin{bmatrix} X \\ Y \\ Z \\ 1 \end{bmatrix}$$ [Equation 5]

$$M = \begin{bmatrix} R & \vec{T} \\ 000 & 1 \end{bmatrix}$$ [Equation 6]

The computer 100 determines pixels corresponding to a part of the target object except the background in the image by calculating the coordinates [U V] of each point of the 3D shape data on the image by using equations 4, 5, and 6. The computer 100 determines which one of the points contained in the 3D shape data corresponds to each pixel.

Assume that the number of pixels corresponding to the target object in the image is a. A vector obtained by vertically arranging the luminance values of the a pixels is set to a comparison image vector $I_c$. A vector obtained by vertically arranging the luminance values of the a pixels at the same pixel positions in the input image is set to an input image vector $I_q$. When a function representing the number of a point of the 3D shape data corresponding to the bth element of the comparison image vector is c(b) (b=1, 2, ... a), a projection matrix F can be defined as a matrix in which the (b,c(b))th element is 1, and the remaining elements are 0. In this case, an image illumination base group $\{B_i\}$ (i=1, 2, ..., 10) corresponding to the current position/posture estimation value is calculated by using equation 7 on the basis of an illumination base group $$\vec{B}_i = \Gamma \vec{G}_i$$ [Equation 7]

The comparison image $I_c$ ($I_c$ is a vector) is calculated by using equations 8 and 9 as an image most approximate to the input image $I_q$ ($I_q$ is a vector) in the linear combination of the image illumination base group $\{B_i\}$.

$$\vec{I}_e = \sum_{i=1}^{10} \lambda_j \vec{B}_i$$ [Equation 8]

$$\lambda_j = \arg\left(\left|\vec{I}_c - \vec{I}_g\right|^2 \to \min\right)$$ [Equation 9]

The above-described comparison image generation method is described in, e.g., reference 2.

No luminance value can be determined for pixels of the generated comparison image, which do not correspond to the object surface. The computer 100 excludes the pixels from the processing target and executes the following processing.

In this embodiment, the method of correcting the variation in illumination condition has been described. If the change in illumination condition is small or zero, the processing may be omitted. In this case, the computer 100 may calculate the comparison image vector $I_c$ by rearranging the luminance values on the object surface, which are stored in advance, by using the function c(b) without calculating the image illumination base group $B_i$ (i=1, 2, ..., 10).

(Image Displacement Distribution Detection Processing)

Next, the computer 100 detects the image displacement distribution for each partial image between the comparison image and the input image by using the following method. The image displacement distribution detection method is not limited to the method of this embodiment. Various techniques proposed as an image displacement detection method using optical flow can be applied.

Figure 13:
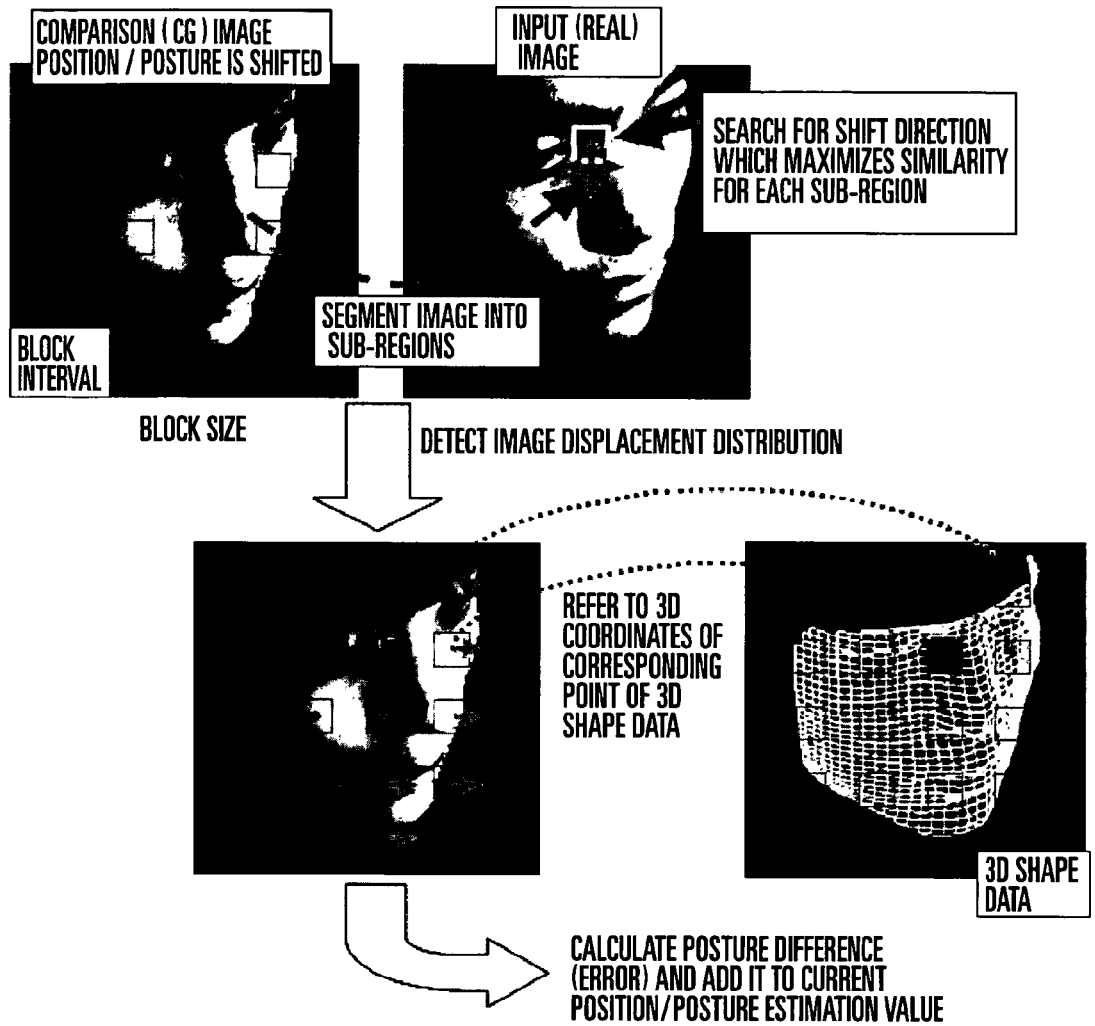
FIG. 13 is an explanatory view showing an example of processing of detecting the image displacement distribution between a comparison image and an input image.
Figure 14:
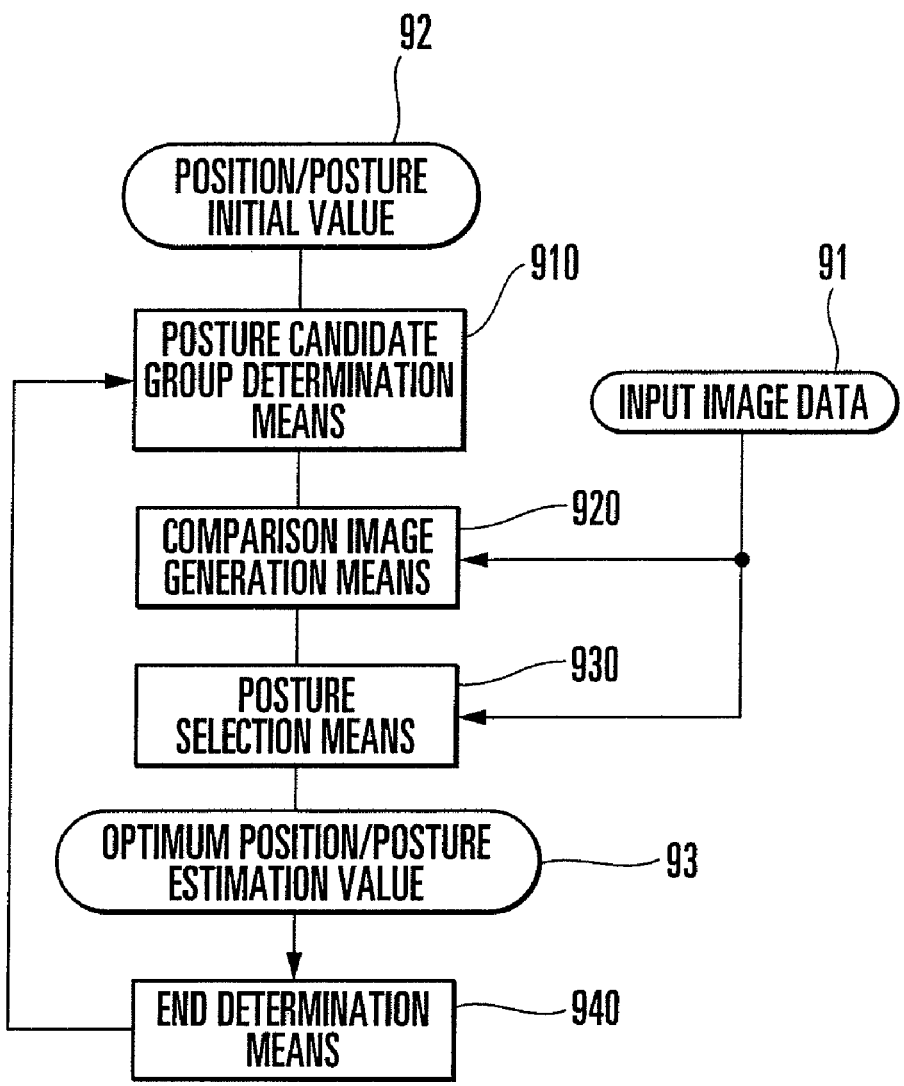
FIG. 14 is a block diagram showing the arrangement of a conventional position/posture recognition apparatus.

FIG. 13 is an explanatory view showing an example of processing of detecting the image displacement distribution between the comparison image and the input image. As shown in FIG. 13, the computer 100 generates partial images by segmenting the comparison image into parts with a predetermined size, thereby generating a partial comparison image group. Assume that the size of the input image is 100×100 pixels, and the block size of the partial image segmented as the partial comparison image is 10×10 pixels. The interval between the blocks to extract the partial comparison images is 20 pixels. In this case, the computer 100 extracts a square region shown as in FIG. 13 from the comparison image as a partial comparison image group.

Fourteen blocks of the extracted partial comparison images include the object surface. The computer 100 extracts the 14 partial comparison images, as shown in FIG. 13. The block size, block interval, and image resolution in extraction are not limited to those of this embodiment. For example, they can be changed depending on the processing capability of the system or the required position/posture estimation accuracy. The computer 100 may detect the image displacement distribution by using a partial image group obtained by segmenting not the comparison image but the input image.

The computer 100 superimposes each extracted partial comparison image at a corresponding position of the input image and compares the partial comparison image with the partial input image extracted in the same size, detects a moving direction on the image to maximize the similarity, and outputs the direction to maximize the similarity as the image displacement distribution. In this case, the computer 100 calculates the similarity by using, of the comparison image, only pixels including the object surface and having calculated luminance values without using the background image containing no object surface.

In this embodiment, an example will be described in which the reciprocal of the mean absolute error (a value obtained by dividing the sum of the absolute values of luminance value differences by the number of pixels) of the luminance values is used as the index of the similarity. Any other image comparison method using, as the index of the similarity, a numerical value obtained by edge detection or other feature amount conversion may be used.

In this embodiment, to quickly detect the image displacement, the computer 100 calculates the similarity by shifting the images in the positive and negative directions of the u and v directions by one adjacent pixel. The computer 100 may calculate the similarity by using not the image displacement detection method described in this embodiment but any other image displacement detection method. For example, the computer 100 may calculate the similarity by shifting the images in the u and v directions by two or more pixels. Alternatively, the computer 100 may calculate the similarity by shifting the pixels even in the oblique directions in addition to the u and v directions, i.e., in eight directions in total.

In this embodiment, the computer 100 determines a 2D vector $D_j$ representing the image displacement of a partial comparison image j by the following method.

(1) The computer 100 calculates the similarity by shifting the images in the positive and negative directions of the u direction by one pixel. If it is determined that the similarity is maximized by shifting in the positive direction, the computer 100 sets the value of the first element of the vector to 1. If it is determined that the similarity is maximized by shifting in the negative direction, the computer 100 sets the value of the first element of the vector to −1. If it is determined that the similarity is maximized without shift in any direction, the computer 100 sets the value of the first element of the vector to 0.

(2) The computer 100 calculates the similarity by shifting the images in the positive and negative directions of the v direction by one pixel. If it is determined that the similarity is maximized by shifting in the positive direction, the computer 100 sets the value of the second element of the vector to 1. If it is determined that the similarity is maximized by shifting in the negative direction, the computer 100 sets the value of the second element of the vector to −1. If it is determined that the similarity is maximized without shift in any direction, the computer 100 sets the value of the second element of the vector to 0.

When the 2D vector is calculated according to the above-described procedures, the computer 100 calculates an image displacement distribution vector group $\{D_j\}$ containing the 2D vector representing the image displacement of each partial comparison image of 14 blocks as the image displacement distribution, as shown in FIG. 13. Referring to FIG. 13, each arrow indicates the 2D vector $D_j$ representing the image displacement of each partial comparison image. For a pixel containing not an arrow but a period symbol, the vector representing the image displacement is a zero vector.

Generally, when the illumination condition of the input image changes with the passage of time, the luminance value of the comparison image is different from that of the input image. Hence, the image displacement distribution vector group $\{D_j\}$ cannot accurately be calculated. According to the present invention, in the comparison image generation processing, a comparison image under an illumination condition equal or analogous to that for the input image is generated by using the illumination base vector group. For this reason, even when the illumination condition at the time of sensing the input image varies, the image displacement distribution vector group $\{D_j\}$ can accurately be detected in the image displacement distribution detection processing.

(Posture Difference Calculation Processing)

Next, on the basis of the generated image displacement distribution and the 3D coordinate data of each part of the 3D shape data of the target object corresponding to each sub-region, the computer 100 calculates a 3D motion which causes each part of the target object to be nearest to the displacement distribution when the target object is moved virtually on the screen. The computer 100 calculates the calculation result of the 3D motion as a position/posture difference value.

In calculating the 3D motion, the computer 100 assumes each of the comparison image and input image as a frame image of a moving image and regards them as a moving image in which a frame image of the comparison image and a frame image of the input image continue in order. The 3D motion is calculated by regarding the image displacement distribution as a pseudo optical flow of the frame images. The computer 100 calculates the 3D motion by using an object motion estimation technique based on optical flow in accordance with the following method using, e.g., a Lie algebra.

A matrix M of equation 5 forms an SE(3) group as a Lie algebra group. SE(3) can be decomposed into a total of six motions, i.e., three rotations and three translations. If the shift of the position/posture of the target object is small, the matrix M is close to a unit matrix I. When differentiation near M=I is done, six matrices of equation 10 are obtained. Each matrix of equation 10 is an Lie algebra of SE(3) and serves as a base of a linear vector space representing the increment of the matrix M near M=I.

$$M_1 = \begin{bmatrix} 0 & 0 & 0 & 1 \\ 0 & 0 & 0 & 0 \\ 0 & 0 & 0 & 0 \\ 0 & 0 & 0 & 0 \end{bmatrix}, M_2 = \begin{bmatrix} 0 & 0 & 0 & 0 \\ 0 & 0 & 0 & 1 \\ 0 & 0 & 0 & 0 \\ 0 & 0 & 0 & 0 \end{bmatrix},$$

$$M_3 = \begin{bmatrix} 0 & 0 & 0 & 0 \\ 0 & 0 & 0 & 0 \\ 0 & 0 & 0 & 1 \\ 0 & 0 & 0 & 0 \end{bmatrix}, M_4 = \begin{bmatrix} 0 & 0 & 0 & 0 \\ 0 & 0 & 1 & 0 \\ 0 & -1 & 0 & 0 \\ 0 & 0 & 0 & 0 \end{bmatrix},$$

$$M_5 = \begin{bmatrix} 0 & 0 & -1 & 0 \\ 0 & 0 & 0 & 0 \\ 1 & 0 & 0 & 0 \\ 0 & 0 & 0 & 0 \end{bmatrix}, M_6 = \begin{bmatrix} 0 & 1 & 0 & 0 \\ -1 & 0 & 0 & 0 \\ 0 & 0 & 0 & 0 \\ 0 & 0 & 0 & 0 \end{bmatrix}$$

[Equation 10]

If the motion is small, the matrix M can be approximated to the linear sum of $\{M_i\}$ given by $$M = \exp\left(\sum_{i=1}^{6} \alpha_1 M_i\right) \approx I + \sum_{i=1}^{6} \alpha_1 M_i \quad \text{[Equation 11]}$$

The computer 100 can calculate the matrix M representing the momentum, i.e., the shift amount (shift direction) of the position/posture by calculating a coefficient $\alpha_i$ based on the image displacement distribution calculated in the image displacement distribution detection processing.

The partial differential of the image coordinates of each point on the object surface in changing the position/posture in the direction of each motion mode i is calculated by $$\begin{bmatrix} u' \\ v' \\ w' \end{bmatrix} = PM_i \begin{bmatrix} X \\ Y \\ Z \\ 1 \end{bmatrix} \quad \text{[Equation 12]}$$

The partial differential of the pixel coordinates [U V] of a point on the object surface is calculated by $$\vec{O_i} = \begin{bmatrix} U' \\ V' \end{bmatrix} = \begin{bmatrix} \dfrac{u'}{w} - \dfrac{uw'}{w^2} \\ \dfrac{v'}{w} - \dfrac{vw'}{w^2} \end{bmatrix} \quad \text{[Equation 13]}$$

In equation 13, $O_i$ ($O_i$ is a vector) represents the partial differential amount of the pixel coordinates [U V]. Let d (d is a vector) be the momentum on the image of the object surface when the position/posture is changed. As indicated by equation 14, d is calculated as a linear sum of momentums in each motion mode i.

$$\vec{d} = \sum_{i=1}^{6} \alpha_i(\vec{O_i}) \quad \text{[Equation 14]}$$

The computer 100 can efficiently make the position/posture estimation value close to the accurate position/posture value of the target object in the input image by updating the position/posture estimation value of the target object such that the momentum d of each point calculated by equation 14 is nearest to the image displacement distribution. To do this, the computer 100 calculates the coefficient $\alpha_i$ to minimize an error e representing a position/posture error with respect to the image displacement of the partial comparison image $D_j$ detected by the image displacement distribution detection processing by using a least square method, as indicated by $$e = \sum_{j} \left\| \vec{D_j} - \sum_{i=1}^{6} \alpha_i(\vec{O_i}) \right\|^2 \quad \text{[Equation 15]}$$

To obtain the coefficient $\alpha_i$, the 3D coordinates [X Y Z] of the partial comparison image j used in equation 12 must be determined. In this embodiment, an example will be described in which the barycenter (mean value) of the 3D coordinates of points on the object surface contained in each partial comparison image j is used. The 3D coordinates can easily be obtained on the basis of the correspondence between the 3D shape data and the pixels of the comparison image calculated as the projection matrix Γ. Not the barycenter but any other coordinate values such as the 3D coordinates of a point on the object surface corresponding to the pixel nearest to the central portion of each partial comparison image may be used as the 3D coordinates.

The computer 100 calculates a position/posture difference ΔM on the basis of the coefficient $\alpha_i$ calculated by using equation 15 and a predetermined gain constant g by using $$\Delta M = I + g\left(\sum_{i=1}^{6} \alpha_i \vec{O_i}\right) \quad \text{[Equation 16]}$$

In this embodiment, the gain constant g is a fixed value g=1. When the value of the gain constant g is increased, the search of the estimation value can quickly converge. When the value of the gain constant g is controlled to be smaller as the position/posture error becomes small, the target object position/posture estimation accuracy can be increased.

The above-described object motion estimation technique is described in, e.g., Tom Drummond, Roberto Ciplla, "Real Time Feature-Based Facial Tracking Using Lie Algebras", IEICE Transactions on Information and Systems, Vol. E84-D, No. 12, December 2001, pp. 1733-1738.

(End Determination Processing)

Next, the computer 100 determines whether to update the position/posture estimation value and repeatedly execute the position/posture estimation processing or to output the current position/posture estimation value as the optimum position/posture estimation value because it is sufficiently accurate. In this embodiment, an example will be described in which the threshold value of tolerance of the estimated position/posture of the target object is determined in advance, and end determination is done on the basis of the threshold value. Not the method using a threshold value of this embodiment but any other method may be used as the end determination method.

As the position/posture estimation error, the threshold values of tolerances in the translation and rotational directions are determined in advance and stored in, e.g., the storage device provided in the computer 100. In this embodiment, the tolerance in the translational direction is 5 mm. For the rotational direction, the tolerances about the X- and Y-axes are 1.5°, and the tolerance about the Z-axis is 1°. The tolerance values are not limited to those of this embodiment.

The computer 100 calculates the translation amount and rotation angles about the respective axes on the basis of the translation vector contained in the position/posture difference ΔM and a rotation matrix R. The computer 100 determines whether the calculated translation amount and rotation angles are smaller than the predetermined threshold values. If it is determined that they are smaller than the threshold values, the computer 100 determines that the current position/posture estimation value is a sufficiently accurate estimation value (i.e., optimum estimation value), outputs the current position/posture estimation value as the optimum position/posture estimation value, and ends the processing.

If it is determined that at least one of the translation amount and rotation angles is not smaller than the threshold value, the computer 100 updates the position/posture estimation value and repeatedly executes the estimation processing. The computer 100 calculates a position/posture estimation value [R*|T*] after update on the basis of a current position/posture estimation value [R|T] by using $$[R^*|T^*] = \text{Euclideanise}([R|T] \cdot \Delta M) \qquad \text{[Equation 17]}$$

where Euclideanise indicates an operation of correcting a matrix to a rotation matrix. For example, Euclideanise(E) indicates an operation of correcting a matrix E to a rotation matrix and is implemented by calculating a matrix $E' = UV^T$ on the basis of singular value decomposition $E = UWV^T$.

On the basis of the rotation matrix and translation vector representing the position/posture after update, which are calculated by using equation 17, the computer 100 estimates the current position/posture estimation value and repeatedly executes processing after the comparison image generation processing.

In this embodiment, the position/posture is repeatedly updated by executing end determination. However, the position/posture estimation value may be updated only once, and the processing may be ended without executing the end determination processing. In this case, the target object position/posture estimation processing can be done more quickly.

In this embodiment, the object position/posture estimation system for estimating both the position and posture of a target object has been described. The computer can also be applied to an object position estimation system for estimating only the position of a target object or an object posture estimation system for estimating only the posture of a target object.

INDUSTRIAL APPLICABILITY

The estimation system for estimating an object state according to the present invention can be applied to a measuring apparatus for measuring the position/posture of an object seen in an image. The estimation system can also be applied to a recognition apparatus for identifying or collating, by using an image, an object whose position/posture changes. The estimation system can also be applied to a tracing apparatus for tracing, by using a moving image, an object which moves in a video image. The estimation system can also be applied to a program for implementing the measuring apparatus, recognition apparatus, or tracing apparatus by using a computer.

The invention claimed is:

1. An estimation system for estimating an object state, comprising:

image input means for inputting an input image containing an object whose state is to be estimated, the state being at least one of a position and posture;

3D shape data storage means for storing 3D shape data of the object;

comparison image generation means for generating, as a comparison image, an image containing the object in a predetermined state by using the 3D shape data stored in said 3D shape data storage means;

image displacement distribution detection means for segmenting the comparison image generated by the comparison image generation means into partial images each corresponding to a sub region with a predetermined size;

image positional relationship detection means for detecting, for each sub region, a positional relationship between the input image and the comparison image generated by said comparison image generation means;

correction amount calculation means for calculating a correction amount of the object state in the comparison image by using the positional relationship detected by said image positional relationship detection means; and state correction means for correcting the object state set in comparison image generation by said comparison image generation means by using the correction amount obtained by said correction amount calculation means, thereby calculating a new object state.

2. The estimation system for estimating an object state according to claim 1, further comprising state determination means for determining on the basis of the correction amount obtained by said correction amount calculation means whether the object state set by said comparison image generation means is appropriate, wherein when it is determined that the object state is appropriate, the object state set by said comparison image generation means is output as an estimation value, and when it is determined that the object state is not appropriate, estimation processing including the comparison image generation processing by said comparison image generation means, the positional relationship detection processing by said image positional relationship detection means, and the correction amount calculation processing by said correction amount calculation means is executed again by setting the new object state calculated by said state correction means to the predetermined state.

3. The estimation system for estimating an object state according to claim 2, wherein said state determination means determines that the object state is appropriate when the correction amount obtained by said correction amount calculation means is smaller than a predetermined amount, and determines that the object state is not appropriate when the correction amount is not smaller than the predetermined amount.

4. The estimation system for estimating an object state according to claim 2, further comprising:

first similarity calculation means for calculating a first similarity between the comparison image and the input image after the estimation processing is executed again; and second similarity calculation means for calculating a second similarity between the comparison image and the input image before the estimation processing is executed again, wherein said state determination means compares the first similarity with the second similarity, determines that the object state is not appropriate when the first similarity is higher than the second similarity, and determines that the object state is appropriate when the first similarity is not higher than the second similarity.

5. The estimation system for estimating an object state according to claim 1, wherein
said image input means comprises means for inputting a moving image containing an object, and
said image positional relationship detection means uses a latest frame image of the moving image as the input image.

6. The estimation system for estimating an object state according to claim 1, wherein said comparison image generation means comprises:
means for reproducing a luminance value of an object surface, which changes depending on an illumination condition; and
means for generating the comparison image under an illumination condition close to that for the input image by using the reproduced luminance value.

7. The estimation system for estimating an object state according to claim 6, further comprising illumination base image group storage means for storing an illumination base image group representing a variation in luminance of the object surface depending on the illumination condition,
wherein said comparison image generation means reproduces the luminance value of the object surface by using the illumination base image group stored in said illumination base image group storage means.

8. The estimation system for estimating an object state according to claim 7, further comprising:
3D shape measuring means for measuring the 3D shape data of the object and reflectance data of the object surface; and
illumination base calculation means for calculating an illumination base image representing the variation in luminance of the object surface depending on the illumination condition by using the 3D shape data and the reflectance data of the object surface which are measured by said 3D shape measuring means.

9. The estimation system for estimating an object state according to claim 8, wherein
said illumination base calculation means calculates a vector group representing the luminance value of each point of the 3D shape data under a plurality of illumination conditions, obtains a base vector group in descending order of eigenvalues by principal component analysis of the vector group, and outputs the base vector group as the illumination base image group, and
said comparison image generation means obtains, by using the 3D shape data of the object, a correspondence between each point of the 3D shape data of the object and a pixel of the image with the object being in an estimation value at current time, generates, by using the correspondence, an image illumination base group in which the illumination base image group is projected to the image with the object being in the estimation value, and generates, as the comparison image, an image nearest to the input image by linear connection of the image illumination base group.

10. The estimation system for estimating an object state according to claim 1, wherein said correction amount calculation means calculates, as the correction amount, a 3D motion of the object which causes a moving amount of an object part corresponding to each sub region in the comparison image to be near to an image displacement distribution by using the 3D shape data of the object and the image displacement distribution representing the positional relationship between the comparison image and the input image for each sub region.

11. The estimation system for estimating an object state according to claim 1, further comprising feature extraction means for extracting an image feature amount of each of the input image and comparison image on the basis of luminance values of the input image and the comparison image generated by said comparison image generation means,
wherein said image positional relationship detection means detects the positional relationship between the input image and the comparison image for each sub region on the basis of the image feature amount extracted by said feature extraction means.

12. An estimation method of estimating an object state using a computerized estimating system that includes a processor, an image inputter, and a 3D shape measurer, the method comprising the steps of:
inputting, using the image inputter, an input image containing an object whose state is to be estimated, the state being at least one of a position and posture;
generating, by the processor, as a comparison image, an image containing the object in a predetermined state by using 3D shape data of the object measured by the 3D shape measurer;
segmenting the comparison image generated by the generating step into partial images each corresponding to a sub region with a predetermined size;
detecting, by the processor, for each sub region, a positional relationship between the comparison image and the input image;
calculating, by the processor, a correction amount of the object state in the comparison image by using the detected positional relationship; and
correcting, by the processor, the object state set in comparison image generation by using the calculated correction amount, thereby calculating a new object state.

13. The estimation method of estimating an object state according to claim 12, further comprising the steps of:
determining, by the processor, on the basis of the calculated correction amount whether the object state set in comparison image generation is appropriate; and
outputting, by the processor, the object state set in comparison image generation as an estimation value when it is determined that the object state is appropriate,
wherein when it is determined that the object state is not appropriate, estimation processing including the step of generating the comparison image, the step of detecting the positional relationship, and the step of calculating the correction amount is executed again by setting the calculated new object state to the predetermined state.

14. The estimation method of estimating an object state according to claim 13, wherein in the determination step, it is determined that the object state is appropriate when the correction amount is smaller than a predetermined amount, and it is determined that the object state is not appropriate when the correction amount is not smaller than the predetermined amount.

15. The estimation method of estimating an object state according to claim 13, further comprising the steps of:
calculating, by the processor, a first similarity between the comparison image and the input image after the estimation processing is executed again; and
calculating, by the processor, a second similarity between the comparison image and the input image before the estimation processing is executed again, wherein in the determination step, the first similarity is compared with the second similarity, it is determined that the object state is not appropriate when the first similarity is higher than the second similarity, and it is determined that the object state is appropriate when the first similarity is not higher than the second similarity.

16. The estimation method of estimating an object state according to claim 12, wherein
in the step of inputting the image, a moving image containing an object is input, and
in the step of detecting the positional relationship, a latest frame image of the moving image is used as the input image.

17. The estimation method of estimating an object state according to claim 12, wherein the step of generating the comparison image comprises the steps of:
reproducing a luminance value of an object surface, which changes depending on an illumination condition; and
generating the comparison image under an illumination condition close to that for the input image by using the reproduced luminance value.

18. The estimation method of estimating an object state according to claim 17, wherein in the step of generating the comparison image, the luminance value of the object surface is reproduced by using an illumination base image group representing a variation in luminance of the object surface depending on the illumination condition.

19. The estimation method of estimating an object state according to claim 18, further comprising the steps of:
measuring, by the 3D shape measurer, the 3D shape data of the object and reflectance data of the object surface; and
calculating, by the processor, an illumination base image representing the variation in luminance of the object surface depending on the illumination condition by using the 3D shape data and the reflectance data of the object surface.

20. The estimation method of estimating an object state according to claim 19, wherein:
in the step of calculating the illumination base image, a vector group representing the luminance value of each point of the 3D shape data under a plurality of illumination conditions is calculated, a base vector group is obtained in descending order of eigenvalues by principal component analysis of the vector group, and the base vector group is output as the illumination base image group, and
in the step of generating the comparison image, a correspondence between each point of the 3D shape data of the object and a pixel of the image with the object being in an estimation value at current time is obtained by using the 3D shape data of the object, an image illumination base group in which the illumination base image group is projected to the image with the object being in the estimation value is generated by using the correspondence, and an image nearest to the input image is generated as the comparison image by linear connection of the image illumination base group.

21. The estimation method of estimating an object state according to claim 12, wherein in the step of processor calculating the correction amount, a 3D motion of the object which causes a moving amount of an object part corresponding to each sub region in the comparison image to be near to an image displacement distribution is calculated as the correction amount by using the 3D shape data of the object and the image displacement distribution representing the positional relationship between the comparison image and the input image for each sub region.

22. The estimation method of estimating an object state according to claim 12, further comprising the step of the processor extracting an image feature amount of each of the comparison image and input image on the basis of luminance values of the comparison image and input image,
wherein in the step of detecting the positional relationship, the positional relationship between the input image and the comparison image for each sub region is detected on the basis of the image feature amount.

23. An estimation program for estimating an object state residing on a non-transitory computer recording medium, which causes a computer to execute the steps of:
inputting an input image containing an object whose state is to be estimated, the state being at least one of a position and posture;
generating, as a comparison image, an image containing the object in a predetermined state by using 3D shape data of the object;
segmenting the comparison image generated by the generating step into partial images each corresponding to a sub region with a predetermined size;
detecting, for each sub region, a positional relationship between the comparison image and the input image;
calculating a correction amount of the object state in the comparison image by using the detected positional relationship; and
correcting the object state set in comparison image generation by using the calculated correction amount, thereby calculating a new object state.

24. The estimation program for estimating an object state residing on a computer recording medium according to claim 23, which causes the computer to further execute the steps of:
determining on the basis of the calculated correction amount whether the object state set in comparison image generation is appropriate;
outputting the object state set in comparison image generation as an estimation value when it is determined that the object state is appropriate; and
executing again estimation processing including the step of generating the comparison image, the step of detecting the positional relationship, and the step of calculating the correction amount by setting the calculated new object state to the predetermined state when it is determined that the object state is not appropriate.

25. The estimation program for estimating an object state residing on a computer recording medium according to claim 24, which causes the computer to execute, as the determination step, the step of determining that the object state is appropriate when the correction amount is smaller than a predetermined amount, and determining that the object state is not appropriate when the correction amount is not smaller than the predetermined amount.

26. The estimation program for estimating an object state residing on a computer recording medium according to claim 24, which causes the computer to further execute:
the step of calculating a first similarity between the comparison image and the input image after the estimation processing is executed again;
the step of calculating a second similarity between the comparison image and the input image before the estimation processing is executed again; and
as the determination step, the step of comparing the first similarity with the second similarity, determining that the object state is not appropriate when the first similarity is higher than the second similarity, and determining that the object state is appropriate when the first similarity is not higher than the second similarity.

27. The estimation program for estimating an object state residing on a computer recording medium according to claim 23, which causes the computer to execute:
as the step of inputting the image, the step of inputting a moving image containing an object; and
as the step of detecting the positional relationship, the step of using a latest frame image of the moving image as the input image.

28. The estimation program for estimating an object state residing on a computer recording medium according to claim 23, which causes the computer to execute, in the step of generating the comparison image, the steps of:
reproducing a luminance value of an object surface, which changes depending on an illumination condition; and
generating the comparison image under an illumination condition close to that for the input image by using the reproduced luminance value.

29. The estimation program for estimating an object state residing on a computer recording medium according to claim 28, which causes the computer to execute, as the step of generating the comparison image, the step of reproducing the luminance value of the object surface by using an illumination base image group representing a variation in luminance of the object surface depending on the illumination condition.

30. The estimation program for estimating an object state residing on a computer recording medium according to claim 29, which causes the computer to further execute the steps of:
measuring the 3D shape data of the object and reflectance data of the object surface; and
calculating an illumination base image representing the variation in luminance of the object surface depending on the illumination condition by using the 3D shape data and the reflectance data of the object surface.

31. The estimation program for estimating an object state residing on a computer recording medium according to claim 30, which causes the computer to execute:
as the step of calculating the illumination base image, the step of calculating a vector group representing the luminance value of each point of the 3D shape data under a plurality of illumination conditions, obtaining a base vector group in descending order of eigenvalues by principal component analysis of the vector group, and outputting the base vector group as the illumination base image group, and
as the step of generating the comparison image, the step of obtaining a correspondence between each point of the 3D shape data of the object and a pixel of the image with the object being in an estimation value at current time by using the 3D shape data of the object, generating an image illumination base group in which the illumination base image group is projected to the image with the object being in the estimation value by using the correspondence, and generating, as the comparison image, an image nearest to the input image by linear connection of the image illumination base group.

32. The estimation program for estimating an object state residing on a computer recording medium according to claim 23, which causes the computer to execute, as the step of calculating the correction amount, the step of calculating, as the correction amount, a 3D motion of the object which causes a moving amount of an object part corresponding to each sub region in the comparison image to be near to an image displacement distribution by using the 3D shape data of the object and the image displacement distribution representing the positional relationship between the comparison image and the input image for each sub region.

33. The estimation program for estimating an object state residing on a computer recording medium according to claim 23, which causes the computer to further execute:
the step of extracting an image feature amount of each of the comparison image and input image on the basis of luminance values of the comparison image and input image; and
as the step of detecting the positional relationship, the step of detecting the positional relationship between the input image and the comparison image for each sub region on the basis of the image feature amount.

* * * * *